US012717384B2

(12) United States Patent
Hyun

(10) Patent No.: US 12,717,384 B2
(45) Date of Patent: Aug. 25, 2026

(54) PORTABLE DISPLAY DEVICE

(71) Applicant: LG ELECTRONICS INC., Seoul (KR)

(72) Inventor: Jihwan Hyun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

(21) Appl. No.: 18/649,896

(22) Filed: Apr. 29, 2024

(65) Prior Publication Data

US 2024/0385656 A1 Nov. 21, 2024

(30) Foreign Application Priority Data

May 16, 2023 (KR) ........................ 10-2023-0062932

(51) Int. Cl.
*G06F 1/16* (2006.01)

(52) U.S. Cl.
CPC ............ *G06F 1/166* (2013.01); *G06F 1/1681* (2013.01)

(58) Field of Classification Search
CPC .... G06F 1/1615; G06F 1/1616; G06F 1/1637; G06F 1/1647; G06F 1/1649; G06F 1/165; G06F 1/1656
See application file for complete search history.

(56) References Cited

U.S. PATENT DOCUMENTS

D215,969 S * 11/1969 Anderson .................... D16/229
D267,251 S * 12/1982 Link ............................ D16/229
4,438,458 A * 3/1984 Munscher ............. G06F 1/1601 D14/375
4,571,456 A * 2/1986 Paulsen ................. G06F 1/1616 345/905
D285,684 S * 9/1986 Akita ........................... D14/128
(Continued)

FOREIGN PATENT DOCUMENTS

CN 210776698 6/2020
CN 115899063 4/2023
(Continued)

OTHER PUBLICATIONS

IP Australia Application Serial No. 2024203250, Office Action dated Jun. 18, 2025, 7 pages.
(Continued)

*Primary Examiner* — Adrian S Wilson
(74) *Attorney, Agent, or Firm* — LEE, HONG, DEGERMAN, KANG & WAIMEY

(57) ABSTRACT

Disclosed is a display device. The display device of the present disclosure may include: a display module including a display panel; a bottom case on which the display module is movably mounted; and a top case hinge-connected to the bottom case, and the bottom case may include an outer shell providing an accommodation space, a bottom frame positioned in the accommodation space of the outer shell, and coupled to the outer shell, a top plate covering the accommodation space, and opposite to the outer shell with respect to the bottom frame, a main board positioned between the bottom frame and the top plate, and coupled to the bottom frame, and a shielding member positioned between the top plate and the main board, and overlapping with at least a part of the main board, and the shielding member may form a first slope with respect to the bottom frame.

9 Claims, 24 Drawing Sheets

(56) References Cited

U.S. PATENT DOCUMENTS

| | | | | |
|---|---|---|---|---|
| 4,919,259 | A * | 4/1990 | Beaulieu | H01R 35/02<br>16/225 |
| 5,305,183 | A * | 4/1994 | Teynor | B23K 11/252<br>361/679.55 |
| 6,404,623 | B1 * | 6/2002 | Koshika | G06F 1/165<br>361/679.04 |
| 6,414,842 | B1 * | 7/2002 | Cipolla | G06F 1/1616<br>361/679.55 |
| 6,442,018 | B1 * | 8/2002 | Dinkin | G06F 1/1628<br>361/679.17 |
| 6,443,644 | B1 * | 9/2002 | Takeda | G06F 3/0202<br>400/490 |
| 6,504,706 | B2 * | 1/2003 | Stewart | G06F 1/1679<br>345/169 |
| 7,002,793 | B2 * | 2/2006 | Imsand | G06F 1/16<br>361/679.04 |
| 7,012,189 | B2 * | 3/2006 | Kriege | G06F 1/182<br>361/816 |
| 7,035,093 | B2 * | 4/2006 | Imsand | G06F 1/166<br>361/679.55 |
| 7,068,508 | B2 * | 6/2006 | Patel | G06F 1/1632<br>165/104.19 |
| 7,221,330 | B2 * | 5/2007 | Finke-Anlauff | G06F 1/1647<br>345/169 |
| 7,365,281 | B2 * | 4/2008 | Yamaguchi | H04M 1/18<br>200/341 |
| 7,385,806 | B2 * | 6/2008 | Liao | G06F 1/1616<br>361/679.01 |
| 7,525,792 | B2 * | 4/2009 | Yokote | G06F 1/1662<br>361/679.02 |
| 7,619,880 | B2 * | 11/2009 | Liang | G06F 1/1616<br>361/679.08 |
| 7,710,716 | B2 * | 5/2010 | Yokote | G06F 1/1662<br>361/752 |
| 7,838,784 | B2 * | 11/2010 | Arisaka | G06F 1/1662<br>200/306 |
| 7,894,184 | B2 * | 2/2011 | Huang | G06F 1/1616<br>361/679.48 |
| 8,011,623 | B2 * | 9/2011 | Hwang | F16M 11/105<br>248/176.1 |
| 8,068,331 | B2 * | 11/2011 | Sauers | G06F 1/1626<br>361/679.01 |
| 8,081,445 | B2 * | 12/2011 | Nakatani | G06F 1/1616<br>361/679.55 |
| 8,199,491 | B2 * | 6/2012 | Uchiyama | G06F 1/1656<br>361/679.55 |
| 8,687,359 | B2 * | 4/2014 | Theobald | G06F 1/1658<br>361/679.55 |
| 8,837,142 | B2 * | 9/2014 | McEwan | G06F 1/1688<br>361/679.55 |
| 9,367,083 | B2 * | 6/2016 | Canova, Jr. | G06F 1/1656 |
| 9,501,097 | B2 * | 11/2016 | Moser | G06F 1/1649 |
| 9,839,152 | B2 * | 12/2017 | La Paglia | B60K 35/10 |
| 9,916,945 | B2 * | 3/2018 | Niu | B32B 37/24 |
| 10,254,803 | B1 * | 4/2019 | Quinn | G06F 1/1688 |
| 10,606,309 | B2 * | 3/2020 | Lin | H01R 13/72 |
| 11,079,802 | B1 * | 8/2021 | Morino | G06F 1/165 |
| 11,262,794 | B2 * | 3/2022 | Wen | G06F 3/0202 |
| 11,379,006 | B2 * | 7/2022 | Yang | G06F 1/1681 |
| 11,395,427 | B2 * | 7/2022 | Jun | G06F 1/182 |
| 11,507,142 | B1 * | 11/2022 | Davis | G06F 1/1656 |
| 11,853,118 | B2 * | 12/2023 | Behar | G06F 1/162 |
| 11,868,177 | B2 * | 1/2024 | Chen | G06F 1/165 |
| D1,033,410 | S * | 7/2024 | Kim | D14/239 |
| D1,047,942 | S * | 10/2024 | Kim | D14/134 |
| D1,052,550 | S * | 11/2024 | Kim | D14/125 |
| D1,055,008 | S * | 12/2024 | Kim | D14/125 |
| 12,238,875 | B2 * | 2/2025 | Hyun | H05K 5/0226 |
| 12,314,096 | B2 * | 5/2025 | Harada | H05K 7/20136 |
| 12,328,829 | B2 * | 6/2025 | Hyun | F16M 11/10 |
| 2003/0057076 | A1 * | 3/2003 | Lee | G06F 1/1656<br>200/302.1 |
| 2004/0218353 | A1 * | 11/2004 | Imsand | G06F 1/1615<br>361/679.55 |
| 2005/0122678 | A1 * | 6/2005 | Patel | G06F 1/1632<br>361/679.41 |
| 2007/0109737 | A1 * | 5/2007 | Kriege | G06F 1/1616<br>361/708 |
| 2008/0037205 | A1 * | 2/2008 | Arisaka | G06F 1/1616<br>361/679.08 |
| 2010/0033916 | A1 * | 2/2010 | Douglas | G06F 1/1654<br>361/679.28 |
| 2010/0246157 | A1 | 9/2010 | Kurahashi et al. | |
| 2011/0013351 | A1 * | 1/2011 | Simmons | G06F 1/162<br>361/679.27 |
| 2011/0216483 | A1 * | 9/2011 | Vesely | G06F 1/1624<br>361/679.01 |
| 2012/0133591 | A1 * | 5/2012 | Simmons | G06F 1/169<br>345/169 |
| 2014/0131184 | A1 * | 5/2014 | Xiao | G06F 1/203<br>200/302.1 |
| 2017/0023981 | A1 | 1/2017 | An et al. | |
| 2017/0042058 | A1 * | 2/2017 | Pope | H01L 23/3735 |
| 2019/0250674 | A1 * | 8/2019 | Lin | G06F 1/1616 |
| 2020/0042041 | A1 * | 2/2020 | Lin | G06F 1/1628 |
| 2020/0183455 | A1 * | 6/2020 | Park | H04M 1/18 |
| 2021/0029853 | A1 | 1/2021 | Kim et al. | |
| 2021/0200272 | A1 * | 7/2021 | Norton, Jr. | C08L 101/14 |
| 2022/0004226 | A1 * | 1/2022 | Yang | G06F 1/1647 |
| 2022/0043478 | A1 * | 2/2022 | Umejima | G06F 1/1681 |
| 2022/0053899 | A1 * | 2/2022 | Valliere | A45C 5/14 |
| 2024/0302860 | A1 * | 9/2024 | Ahn | G06F 1/1681 |
| 2024/0324117 | A1 * | 9/2024 | Hyun | G06F 1/1681 |

FOREIGN PATENT DOCUMENTS

| | | |
|---|---|---|
| JP | 2005339943 | 12/2005 |
| JP | 2008292691 | 12/2008 |
| JP | 2015142039 | 8/2015 |
| KR | 1020010114183 | 12/2001 |
| KR | 1020030025701 | 3/2003 |
| KR | 1020190034969 | 4/2019 |
| KR | 1020210012835 | 2/2021 |

OTHER PUBLICATIONS

Japan Patent Office Application No. 2024-073402, Notice of Allowance dated Jun. 24, 2025, 3 pages.
Korean Intellectual Property Office Application No. 10-2023-0062932, Notice of Allowance dated Oct. 4, 2024, 2 pages.

* cited by examiner

12

PORTABLE DISPLAY DEVICE

CROSS-REFERENCE TO RELATED APPLICATION(S)

Pursuant to 35 U.S.C. § 119, this application claims the benefit of earlier filing date and right of priority to Korean Application No(s). 10-2023-0062932, filed on May 16, 2023, the contents of which are all incorporated by reference herein in its entirety.

TECHNICAL FIELD

The present disclosure relates to a display device.

BACKGROUND

With the development of the informatization society, the demands for display devices are also increasing in various forms, and in recent years, various display devices including Liquid Crystal Display Device (LCD), Plasma Display Panel (PDP), Electro luminescent Display (ELD), Vacuum Fluorescent Display (VFD), Organic Light Emitting Diode (OLED), etc., have been studied and used.

Among them, an LCD panel includes a TFT substrate and a color substrate facing each other with a liquid crystal layer interposed therebetween, and can display an image by using light provided from a backlight unit. In addition, an OLED panel can display the image by depositing an organic layer that can autonomously emit light on a substrate with a transparent electrode.

Recently, many studies have been conducted on display devices available outdoors. In addition, there are many studies on the structure that improves the storage and portability of the display device.

SUMMARY

In view of the above, an object of the present disclosure is to solve the above-described problems and other problems.

Another object of the present disclosure may be to provide a structure which may easily store and carry a display device.

Yet another object of the present disclosure may be to provide a structure which may easily enhance durability and rigidity of the display device.

Still yet another object of the present disclosure may be to provide a heat dissipation structure of a portable display device.

Still yet another object of the present disclosure may be to provide a shock absorption structure of the portable display device.

Still yet another object of the present disclosure may be to provide a drainage structure of the portable display device.

In order to achieve the or other objects, according to an aspect of the present disclosure, a display device may include: a display module including a display panel; a bottom case on which the display module is movably mounted; and a top case hinge-connected to the bottom case, and the bottom case may include an outer shell providing an accommodation space, a bottom frame positioned in the accommodation space of the outer shell, and coupled to the outer shell, a top plate covering the accommodation space, and opposite to the outer shell with respect to the bottom frame, a main board positioned between the bottom frame and the top plate, and coupled to the bottom frame, and a shielding member positioned between the top plate and the main board, and overlapping with at least a part of the main board, and the shielding member may form a first slope with respect to the bottom frame.

Effects of the display device according to the present disclosure will be described below.

According to at least one of embodiments of the present disclosure, a structure which may easily store and carry a display device can be provided.

According to at least one of embodiments of the present disclosure, a structure which may easily enhance durability and rigidity of the display device can be provided.

According to at least one of embodiments of the present disclosure, a heat dissipation structure of a portable display device can be provided.

According to at least one of embodiments of the present disclosure, a shock absorption structure of the portable display device can be provided.

According to at least one of embodiments of the present disclosure, a drainage structure of the portable display device can be provided.

An additional range of an applicability of the present disclosure will be apparent from the following detailed description. However, since various changes and modifications can be clearly appreciated by those skilled in the art within the spirit and the scope of the present disclosure, the detailed description and a specific embodiment such as a preferred embodiment of the present disclosure should be appreciated as being just given as an example.

DETAILED DESCRIPTION

Figure 1:
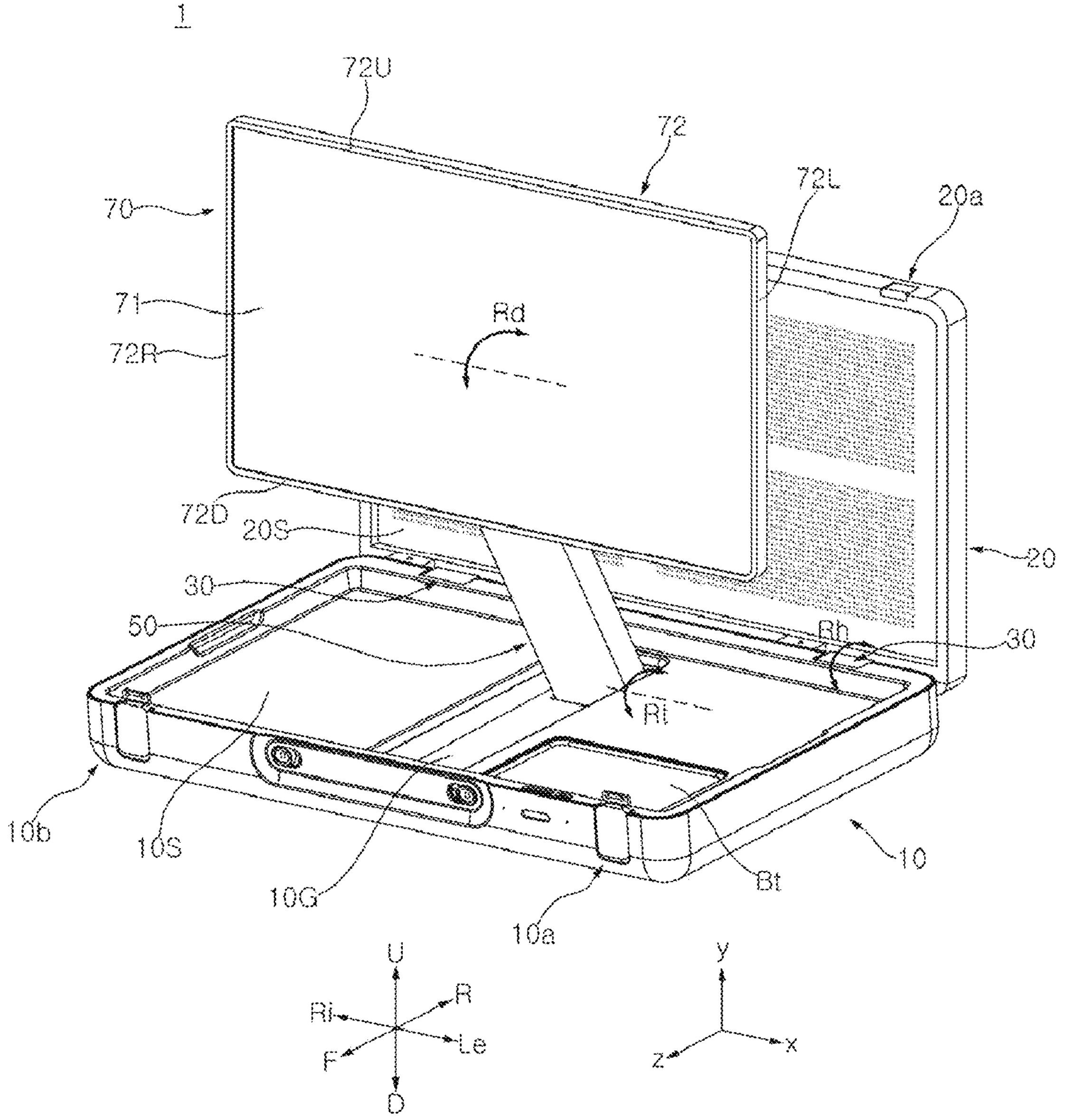
FIGS. 1 to 24 are diagrams illustrating examples of a display device according to embodiments of the present disclosure.

Hereinafter, embodiments disclosed in the present disclosure will be described in detail with reference to the accompanying drawings and the same or similar components are denoted by the same reference numerals regardless of a sign of the drawing, and duplicated description thereof will be omitted.

Suffixes "module" and "unit" for components used in the following description are given or mixed in consideration of easy preparation of the present disclosure only and do not have their own distinguished meanings or roles.

Further, in describing the embodiment of the present disclosure, a detailed description of related known technologies will be omitted if it is determined that the detailed description makes the gist of the embodiment disclosed in the present disclosure unclear. Further, it is to be understood that the accompanying drawings are just used for easily understanding the embodiments disclosed in the present disclosure and a technical spirit disclosed in the present disclosure is not limited by the accompanying drawings and all changes, equivalents, or substitutes included in the spirit and the technical scope of the present disclosure are included.

Terms including an ordinary number, such as first and second, are used for describing various constituent elements, but the constituent elements are not limited by the terms. The terms are used only to discriminate one component from another component.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

A singular form includes a plural form if there is no clearly opposite meaning in the context.

In the present disclosure, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Direction indications of up (U), down (D), left (Le), right (Ri), front (F), and rear (R) are only for the convenience of the description, and the technical spirit disclosed in the present disclosure is not limited thereto.

A display panel of the present disclosure may be an LCD panel or an OLED panel, but the type of display panel which may be applied to the present disclosure is not limited thereto.

Figure 2:
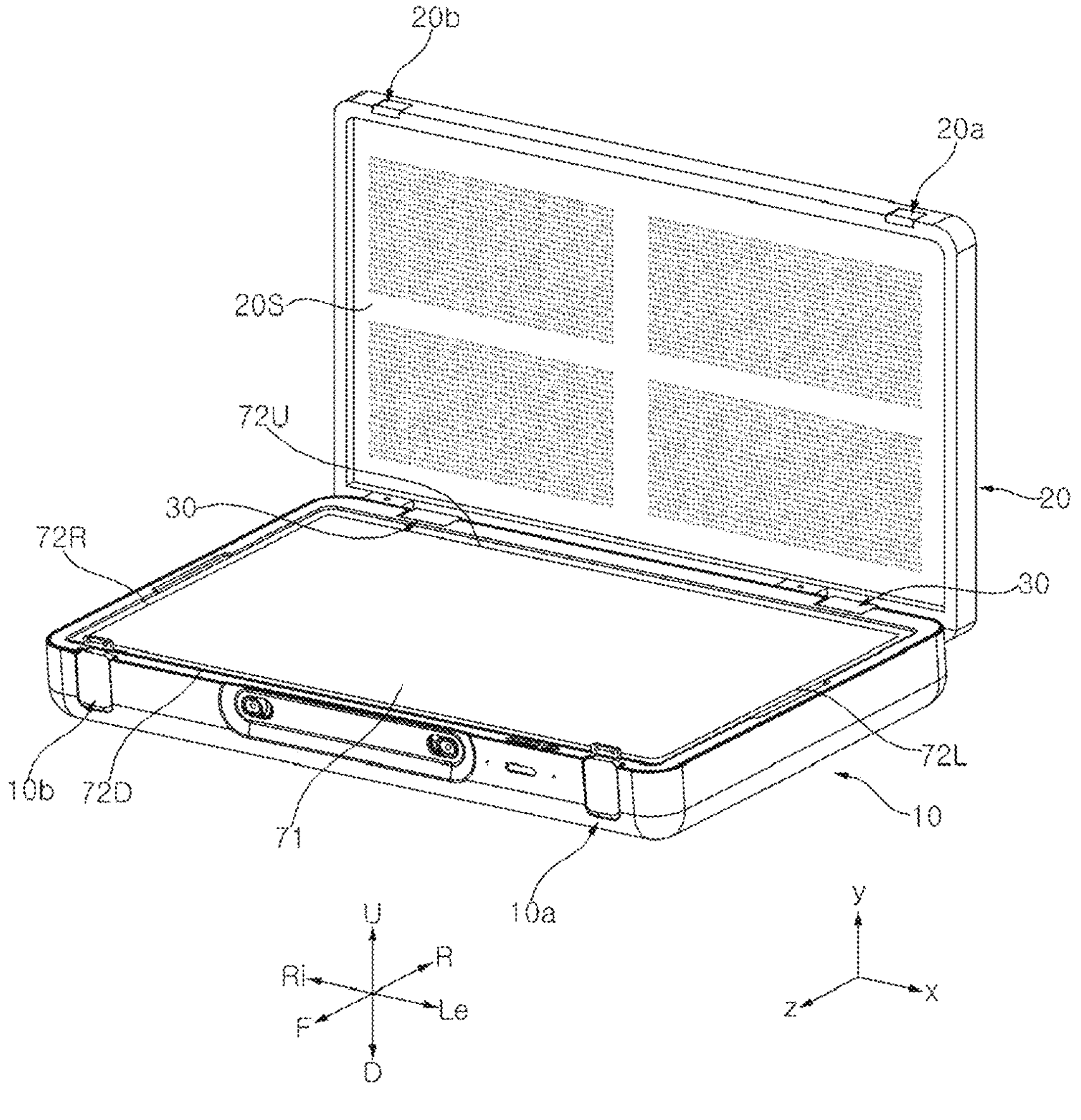

Referring to FIGS. 1 and 2, a display device 1 may include a base 10, a cover 20, a hinge 30, an arm 50, and a display 70.

The base 10 may have a generally flat box shape. A susceptor 10S maybe formed to be recessed downward from the top of the base 10. The susceptor 10S is referred as to a seating part 10S. A size of the susceptor 10S may correspond to a size of the display 70. For example, the base 10 may include a plastic material. The base 10 may be referred to as a lower body 10, a lower case 10, a lower housing 10, a bottom box 10, a bottom cabinet 10, or a bottom case 10.

The cover base 20 may have the generally flat box shape. An exterior of the cover 20 may resemble an exterior of the base 10. A recess 20S may be formed on one surface of the cover 20, and may be opposite to the susceptor 10S to the display 70. For example, the cover 20 may include the plastic material. The cover 20 may be referred to as an upper body 20, an upper case 20, an upper housing 20, a top box 20, a top cabinet 20, or a top case 20.

One side of the hinge 30 may be adjacent to or positioned on one side of the base 10, and coupled to the base 10, and may rotate around a central axis of the hinge 30. The other side of the hinge 30 may be adjacent to or positioned on one side of the cover 20, and coupled to the cover 20, and may rotate around the central axis of the hinge 30. The one side of the base 10 may be one long side of the base 10, and the one side of the cover 20 may be one long side of the cover adjacent to the one long side of the base 10. For example, a plurality of hinges 30 may be spaced apart from each other along the one long side. The number of hinges 30 may be two.

The arm 50 may be extended in a direction crossing the base 10. The arm 50 may have a generally square lumber shape. A groove 10G may be formed to be recessed downward at the recess 10S, and may have a shape corresponding to the arm 50. One end of the arm 50 may be adjacent to one end of the groove 10G, and positioned on the groove 10G. The arm 50 may be coupled to be base 10 to be rotatably around a first axis adjacent to the one end of the arm 50 (see reference numeral Rt of FIG. 1). The first axis may be in line in left and right directions. The other end of the arm 50 may be coupled to a central portion of a rear surface of the display 70. The display 70 may be coupled to the arm 50 to be rotatable around a second axis adjacent to the other end of the arm 50 (see reference numeral Rd of FIG. 1). The second axis may be parallel to the first axis. The arm 50 may be called a pole 50, a bar 50, or a lever 50.

The display 70 may include a display panel 71 and a side cover 72. The display panel 71 may define a front surface of the display 70, and display an image. The side cover 72 may be extended along a circumference of the display panel 71, and may cover a side surface of the display panel 71. A third part 72U may define an upper side of the side cover 72, and a second part 72D may define a lower side of the side cover 72. A third part 72L may define a left side of the side cover 72, and a fourth part 72R may define a right side of the side cover 72. The display 70 may be called a display unit 70 or a display module 70.

For example, a user may pivot the arm 50 around the first axis. When the arm 50 is pivoted, a location of the other end of the arm 50 may be raised. The user may rotate the display 70 around the second axis to face a front of the display panel 71. The user may adjust an angle of the arm 50 to the base 10, and an angle of the display 70 to the arm 50.

As another example, the user may pivot the arm 50 around the first axis. When the arm 50 is reversely pivoted, a location of the other end may be lowered. Further, the arm 50 may be seated on the groove 10G. The user may rotate the display 70 around the second axis so as for the display panel 71 to face upward.

Figure 3:
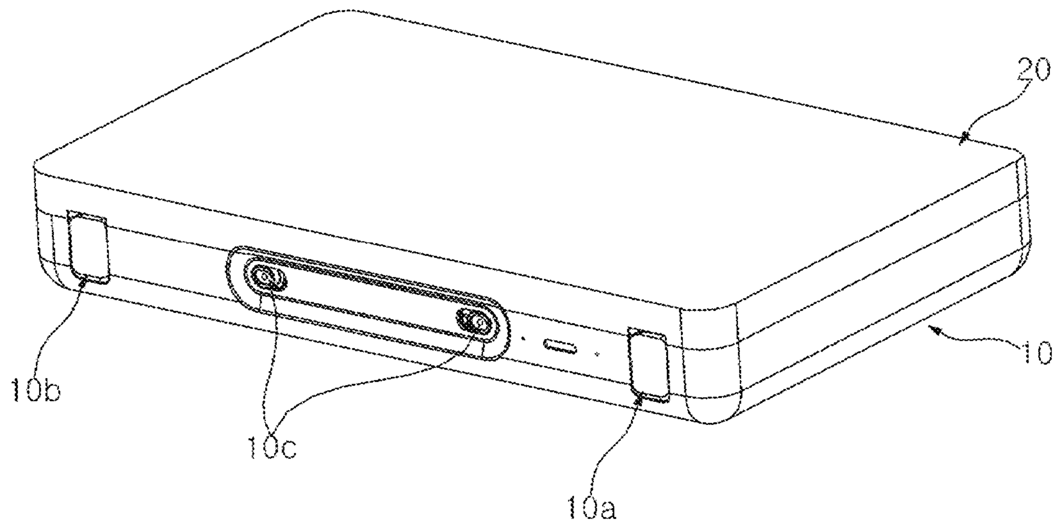

Referring to FIGS. 2 and 3, the user may pivot the cover 20 around the central axis of the hinge 30 so that the cover 20 overlaps on the base 10. The display panel 71 may be sandwiched between the base 10 and the cover 20.

Locks 10*a* and 10*b* of the base 10 may be provided on the other side of the base 10 opposite to one side of the base 10 adjacent to the hinge 30. The locks 10*a* and 10*b* of the base 10 may be called lock assemblies 10*a* and 10*b* or locking units 10*a* and 10*b*. Recessed portions 20*a* and 20*b* of the cover 20 may be provided on the other side of the cover 20 opposite to one side of the cover 20 adjacent to the hinge 30. The user may overlap the cover 20 on the base 10, and then lock the locks 10*a* and 10*b* on the recessed portions 20*a* and 20*b*. As a result, the user may carry the display 70 while keeping the display 60 inside the base 10 and the cover 20. Further, a handle (not illustrated) which the user may hold with a hand may be mounted on a button 10*c* formed at one side of the base 10.

Figure 4:
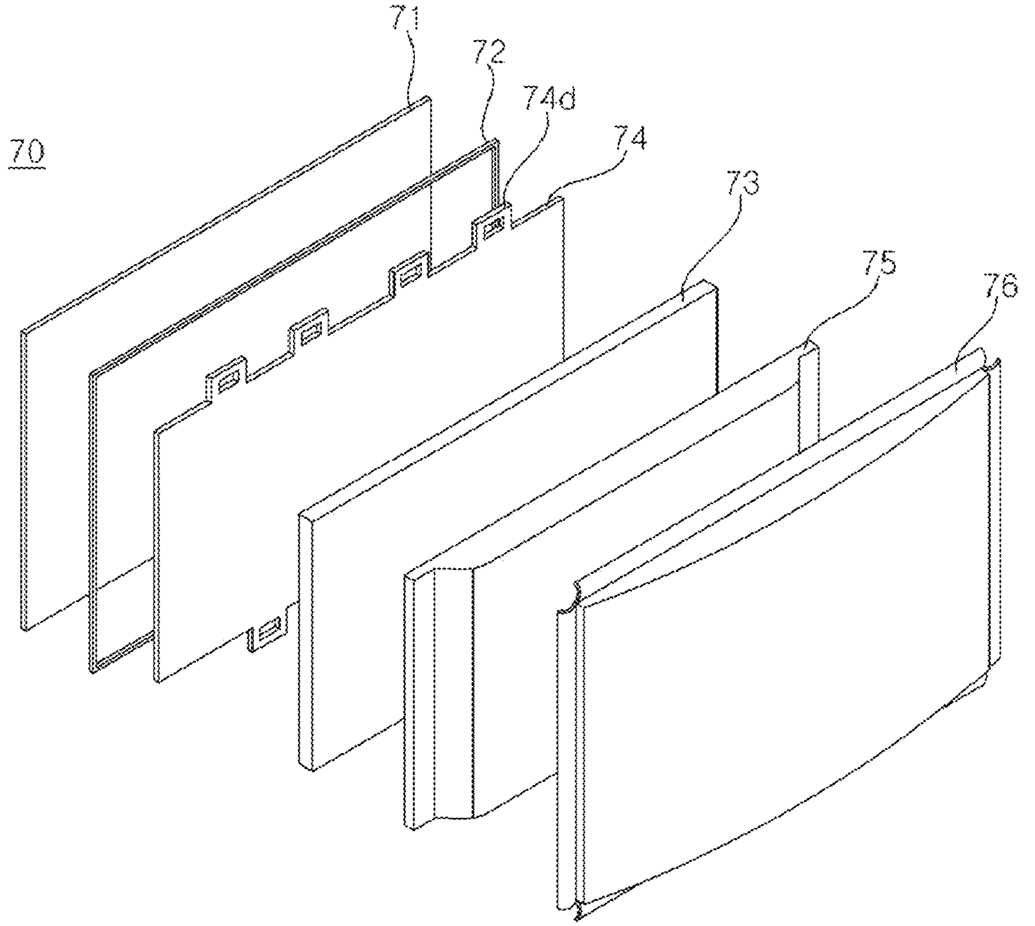

Referring to FIG. 4, the display 70 may include a display panel 71, a side cover 72, backlight units 73 and 74, a frame 75, and a back cover 76.

The display panel 71 may form a front surface of the display 70, and display an image. In the display panel 71, a plurality of pixels output red, green, or blue (RGB) for each pixel according to a timing to display the image. The display panel 71 may be divided into an active area in which the image is displayed and a de-active area in which the image is not displayed. The display panel 71 may include a front substrate and a rear substrate opposite to each other with the liquid crystal layer interposed therebetween. The display panel 71 may be called an LCD panel.

The front substrate may include a plurality of pixels constituted by red, green, and blue sub pixels. The front substrate may output light corresponding to a red, green, or blue color according to a control signal.

The rear substrate may include switching elements. The rear substrate may switch a pixel electrode. For example, the pixel electrode may change a molecular array of the liquid crystal layer according to a control signal input from the outside. The liquid crystal layer may include liquid crystal molecules. An array of the liquid crystal molecules may be changed in response to a voltage difference generated between the pixel electrode and a common electrode. The liquid crystal layer may deliver light from the backlight units 73 and 74 to the front substrate or block the light.

The side cover 72 may surround the circumference of the display panel 71, and cover the side surface of the display panel 71. The side cover 72 may be coupled to the display panel 71, and may support the display panel 71. The side cover 72 may be called a guide panel 72, a side frame 72, or a middle cabinet 72.

The backlight units 73 and 74 may be positioned in the rear of the display panel 71. The backlight units 73 and 74 may include light sources. The backlight units 73 and 74 may be coupled to a frame 75 in front of the frame 75. The backlight units 73 and 74 may be driven by a full driving mode or a partial driving mode such as local dimming, impulsive, etc. The backlight units 73 and 74 may include an optical sheet 74 and an optical layer 73.

The optical sheet 74 may evenly deliver light of a light source to the display panel 71. The optical sheet 74 may be constituted by a plurality of layers. For example, the optical sheet 74 may include a prism sheet or a diffusion sheet. Meanwhile, a coupler 74*d* of the optical sheet 74 may be coupled to the frame 75 and/or the back cover 76.

The frame 75 may be positioned in the rear of the backlight units 73 and 74, and may support components of the display 70. An edge of the frame 75 may be fixed to the side cover 72. For example, components such as the backlight units 73 and 74, a printed circuit board (PCB) at which a plurality of electronic elements are positioned, etc., may be coupled to the frame 75. For example, the frame 75 may include a metallic material. The frame 75 may be called a main frame 75, a module cover 75, or a cover bottom 75.

The back cover 76 may cover a rear of the frame 75. The back cover 76 may be coupled to the frame 75. For example, the back cover 76 may include the metallic or plastic material.

Figure 5:
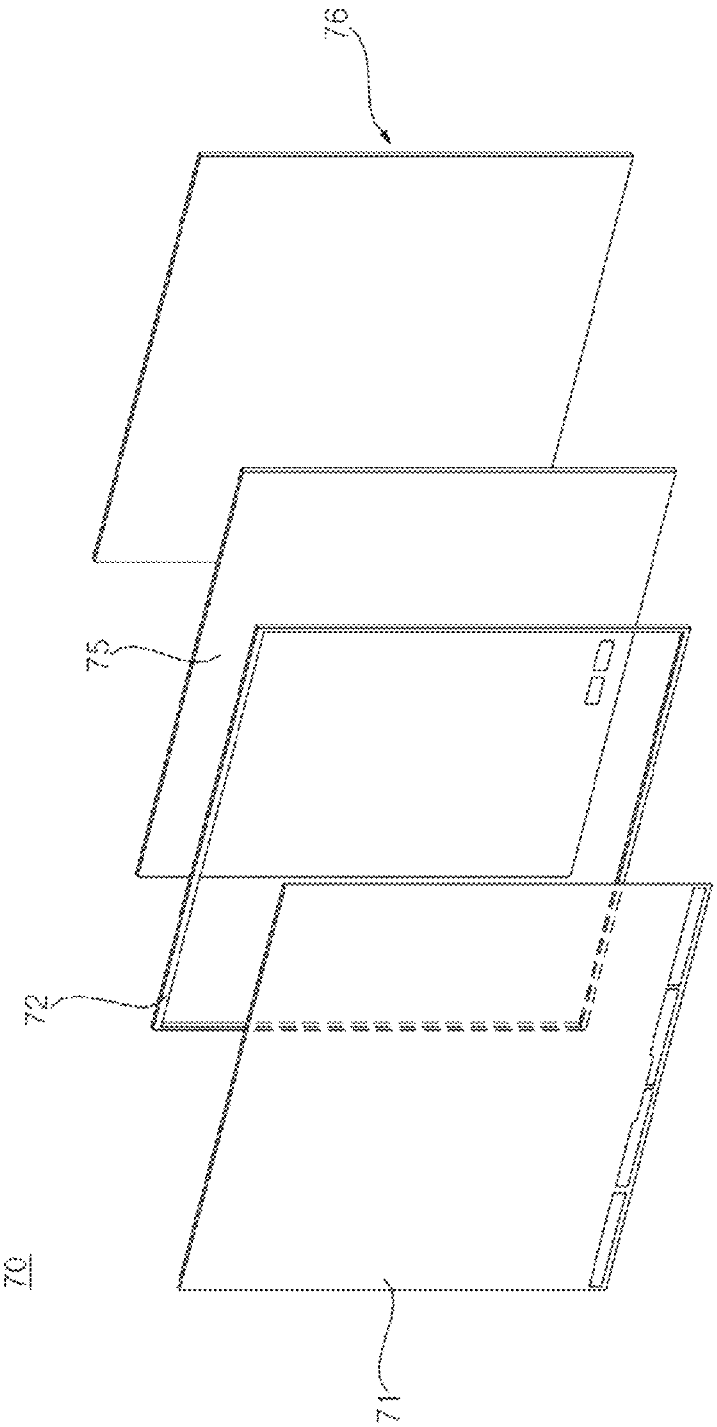

Referring to FIG. 5, the display 70 may include the display panel 71, the side cover 72, the frame 75, and the back cover 76.

The display panel 71 may form the front surface of the display 70, and display the image. The display panel 71 may segment the image into a plurality of pixels, and output image according to a color, brightness, and chroma for each pixel. The display panel 71 may be divided into an active area in which the image is displayed and a de-active area in which the image is not displayed. The display panel 71 may generate light corresponding to the red, green, or blue color according to the control signal. The display panel 71 may be called an OLED panel.

The side cover 72 may surround the circumference of the display panel 71, and cover the side surface of the display panel 71. The side cover 72 may be coupled to the display panel 71, and may support the display panel 71. The side cover 72 may be called a guide panel 72, a side frame 72, or a middle cabinet 72.

The frame 75 may be positioned in the rear of the display panel 71, and the display panel 71 may be coupled to the frame 75. The edge of the frame 75 may be fixed to the side cover 72. Electronic parts may be mounted on the frame 75. For example, the frame 75 may include the metallic material. The frame 75 may be called a main frame 75, a module cover 75, a cover bottom 75, or a panel frame 75.

The back cover 76 may cover a rear of the frame 75. The back cover 76 may be coupled to the frame 75. For example, the back cover 76 may include the metallic or plastic material.

Figure 6:
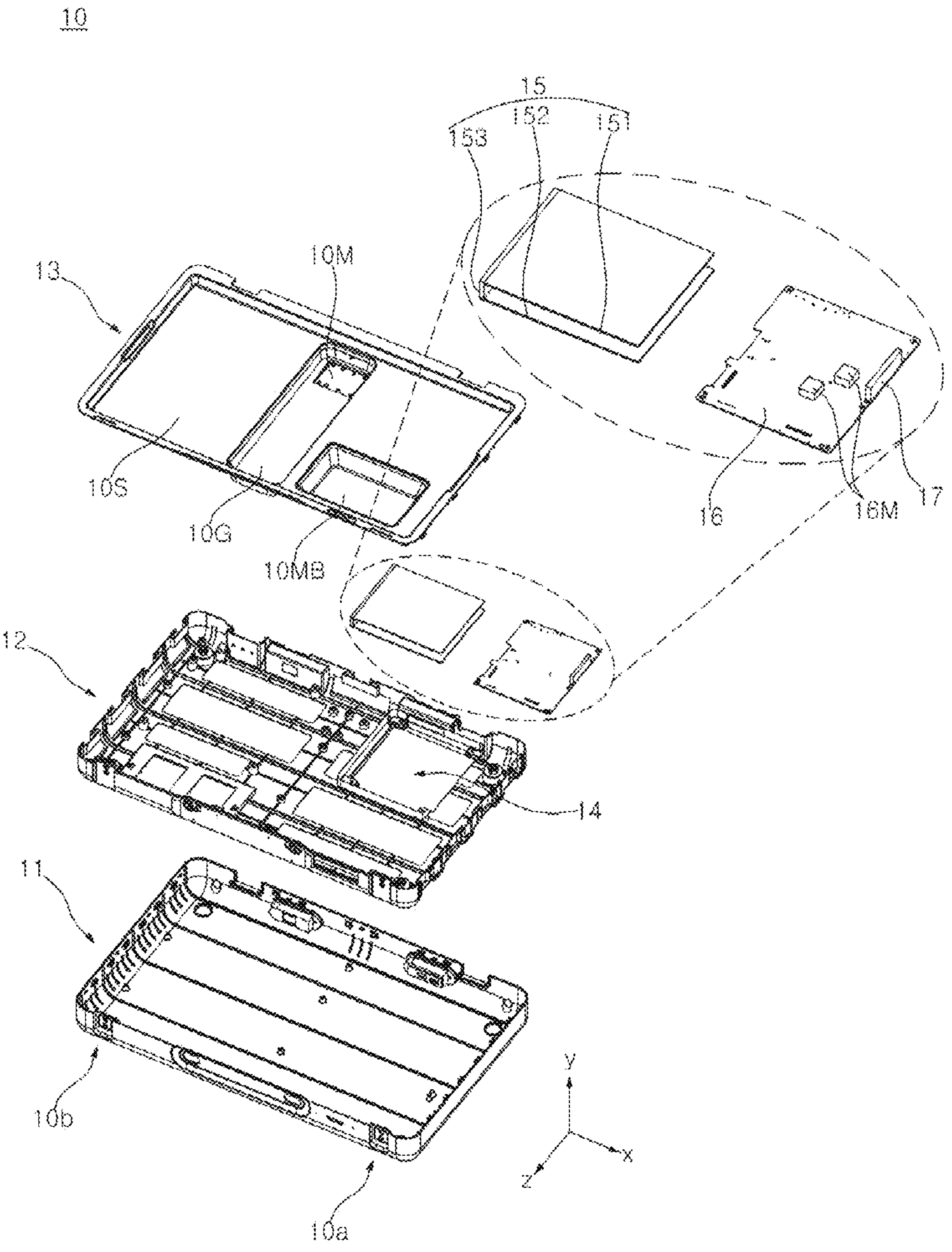

Referring to FIG. 6, the base 10 may include a bottom 11, a frame 12, a top 13, a jacket 15, and a substrate 16.

The bottom 11 may define a bottom surface of the base 10, and have a generally square tray shape. The bottom 11 may be called an outer shell 11 or an outer case 11, or a bottom part 11 or a housing 11, or a tray 11. Locks 10*a* and 10*b* may be provided on a lateral surface of the bottom 11.

The frame 12 may form a skeleton of the base 10. The frame 12 may be positioned on the bottom 11, and coupled to the bottom 11.

The top 13 may define a top surface of the base 10, and have a generally plate shape. The top 13 may be opposite to the bottom 11 with respect to the frame 12, and may cover the frame 12. The top 13 may be detachably coupled to the frame 12 and/or the bottom 11 The top 13 may be called a top part 13, a cap 13, a top case 13, or a top plate 13.

The susceptor 10S and the groove 10G may be formed on the top surface of the top 13. A recess 10M may be adjacent to one end of the groove 10G, and may be formed to be recessed downward from the top surface of the groove 10G. One end of the arm 50 (see FIG. 1) may be pivotably coupled to the recess 10M.

For example, a mounting portion 10MB may be formed to be recessed downward from the top surface of the top 13, and a battery Bt (see FIG. 1) may be detachably mounted on the mounting portion 10MB. The battery Bt may provide electric power to the display 70 (see FIG. 1), and may be chargeable. As another example, the battery Bt may also be embedded between the frame 12 and the top 13.

The jacket 15 and the substrate 16 may be positioned between the frame 12 and the top 13, and coupled to the frame 12. At least one element 16M may be mounted on the substrate 16. The element 16M may be an electronic element that generates heat upon operating. The element 16M may be called a heating element 16M. For example, the element 16M may be an IC chip or a system on chip (SOC).

Figure 7:
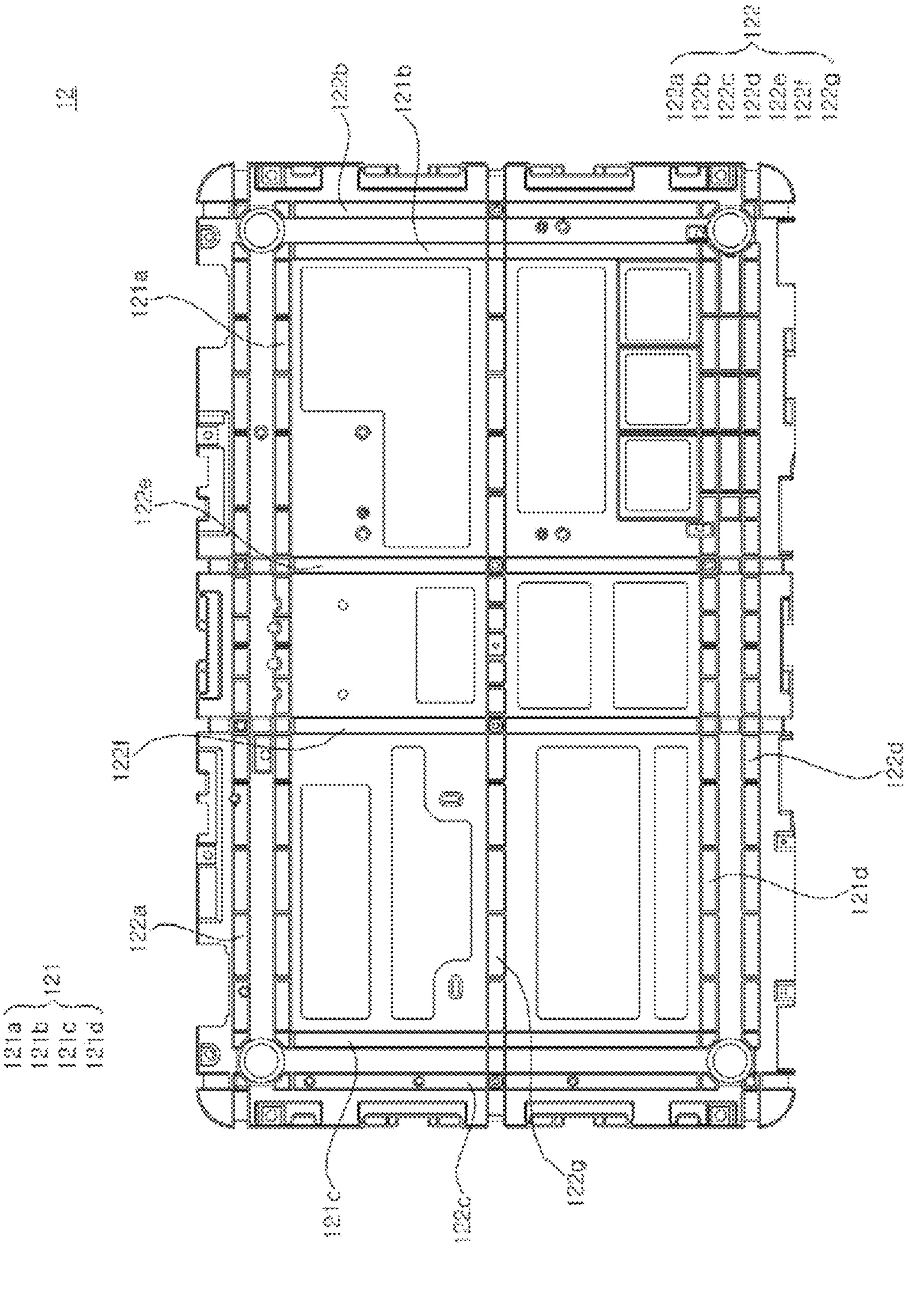

Referring to FIG. 7, the frame 12 may be made of a high-strength ultra-light material. For example, the frame 12 may be formed by magnesium die casting. The frame 12 may include a first beam part 121 and a second beam part 122. The frame 12 may be called a bottom frame 12, a box frame 12, a bottom box frame 12, or a bottom case frame 12.

The first beam part 121 may form an inner beam 121. The inner beam 121 may include a first part 121*a*, a second part 121*b*, a third part 121*c*, and a fourth part 121*d*. The first part 121*a* may face the fourth part 121*d*. The second part 121*b* may face the third part 121*c*. The first part 121*a* may connect one end of the second part 121*b* and one end of the third part 121*c*, and the fourth part 121*d* may connect the other end of the second part 121*b* and the other end of the third part 121*c*. For example, the first part 121*a*, the second part 121*b*, the third part 121*c*, and/or the fourth part 121*d* may have the same cross-sectional shape as each other.

The second beam part 122 may form outer beams 122*a*, 122*b*, 122*c*, and 122*d* and cross beams 122*e*, 122*f*, and 122*g*. The outer beams 122*a*, 122*b*, 122*c*, and 122*d* may include a first part 122*a*, a second part 122*b*, a third part 122*c*, and a fourth part 122*d*. The first part 122*a* may face the fourth part 122*d*. The second part 122*b* may face the third part 122*c*. The first part 122*a* may connect one end of the second part 122*b* and one end of the third part 122*c*, and the fourth part 122*d* may connect the other end of the second part 122*b* and the other end of the third part 122*c*. For example, the first part 122*a*, the second part 122*b*, the third part 122*c*, and/or the fourth part 122*d* may have the same cross-sectional shape as each other.

The cross beams 122*e*, 122*f*, and 122*g* may include vertical parts 122*e* and 122*f* and a horizontal part 122*g*. The horizontal part 122*g* may be in line with the first part 121*a* and/or the fourth part 121*d* of the inner beam 121 between the first part 121*a* and the fourth part 121*d* of the inner beam 121. The horizontal part 122*g* may cross the second part 121*b* and the third part 121*c* of the inner beam 121, and cross the second part 122*b* and the third part 122*c* of the outer beams 122*a*, 122*b*, 122*c*, and 122*d*.

The vertical parts 122*e* and 122*f* may include a first vertical part 122*e* and a second vertical part 122*f*. The first vertical part 122*e* may be positioned between the second part 121*b* and the third part 121*c* of the inner beam 121, and cross the first part 121*a* and/or the fourth part 121*d* of the inner beam 121. The first vertical part 122*e* may cross the first part 122*a* and/or the fourth part 122*d* of the outer beams 122*a*, 122*b*, 122*c*, and 122*d*. The second vertical part 122*f* may be positioned between the second part 121*b* and the third part 121*c* of the inner beam 121, and cross the first part 121*a* and/or the fourth part 121*d* of the inner beam 121. The second vertical part 122*f* may cross the first part 122*a* and/or the fourth part 122*d* of the outer beams 122*a*, 122*b*, 122*c*, and 122*d*.

Figure 8:
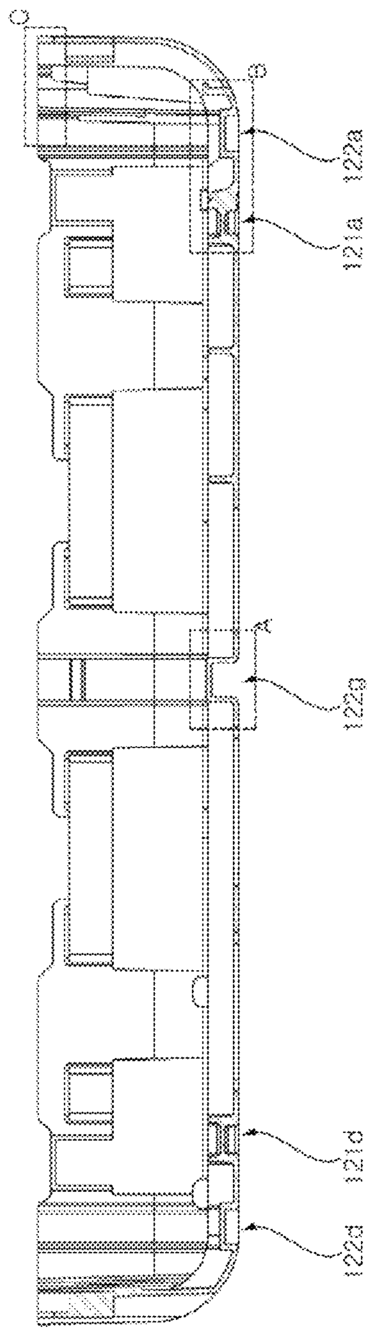
Figure 9:
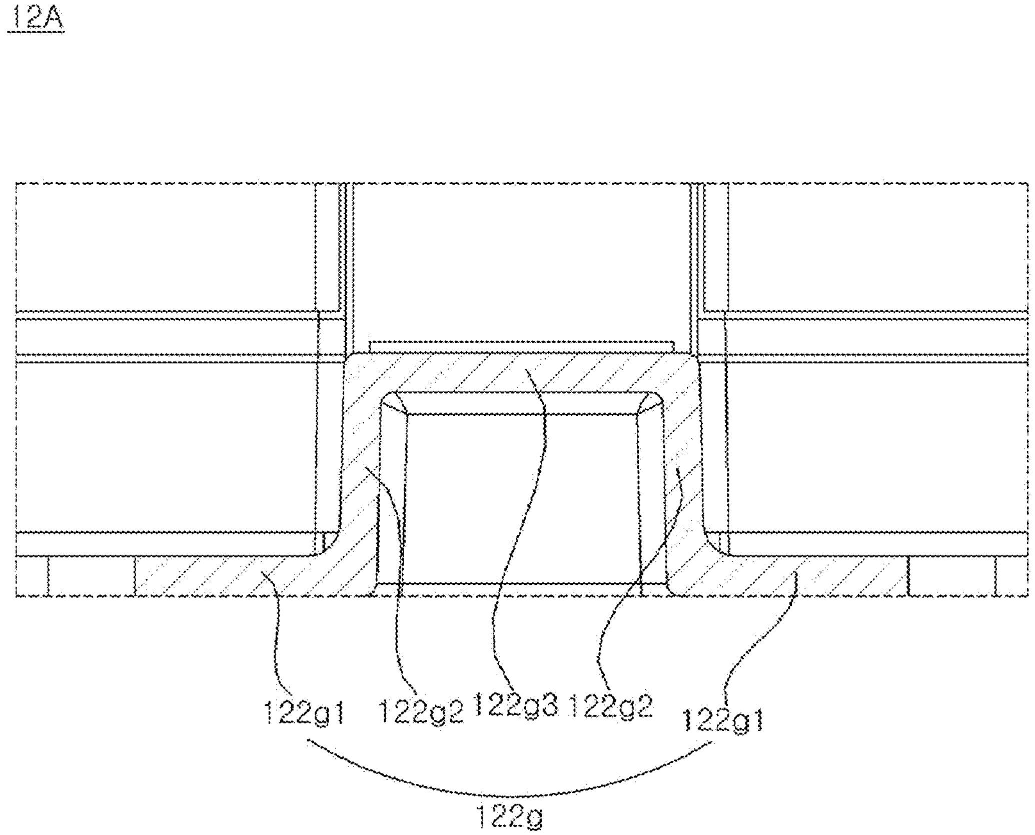

Referring to FIGS. 8 and 9, the horizontal part 122*g* of the cross beams 122*e*, 122*f*, and 122*g* may include a bottom part 122*g*1, a side part 122*g*2, and a top part 122*g*3. The bottom part 122*g*1 may form a bottom surface of the horizontal part 122*g* of the cross beams 122*e*, 122*f*, and 122*g*.

The side part 122*g*2 may be curved and extended from the bottom part 122*g*1. The top part 122*g*3 may be curved and extended from the side part 122*g*2. For example, the bottom part 122*g*1, the top part 122*g*3, and the side part 122*g*2 may have a generally U shape. As a result, the rigidity of the frame 12 may be enhanced.

Figure 10:
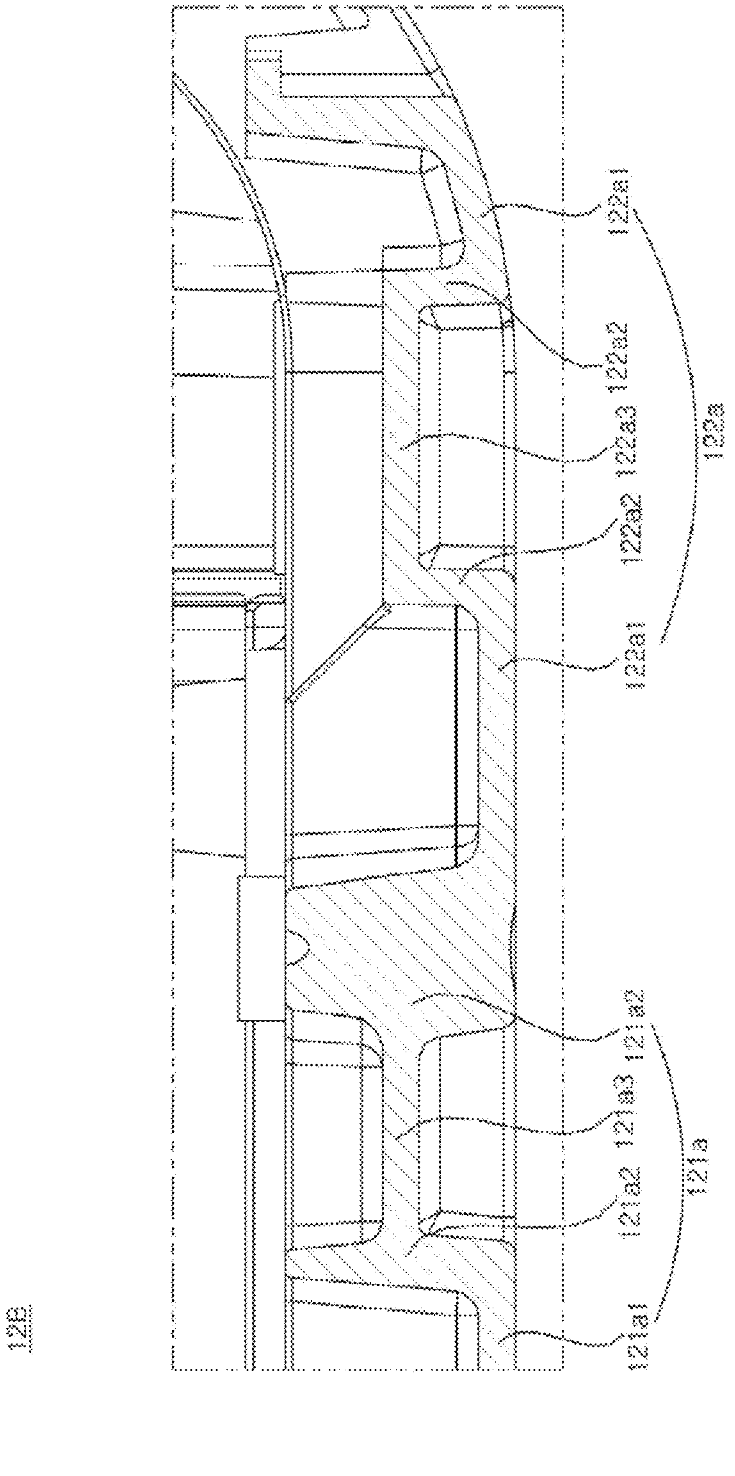
Figure 11:
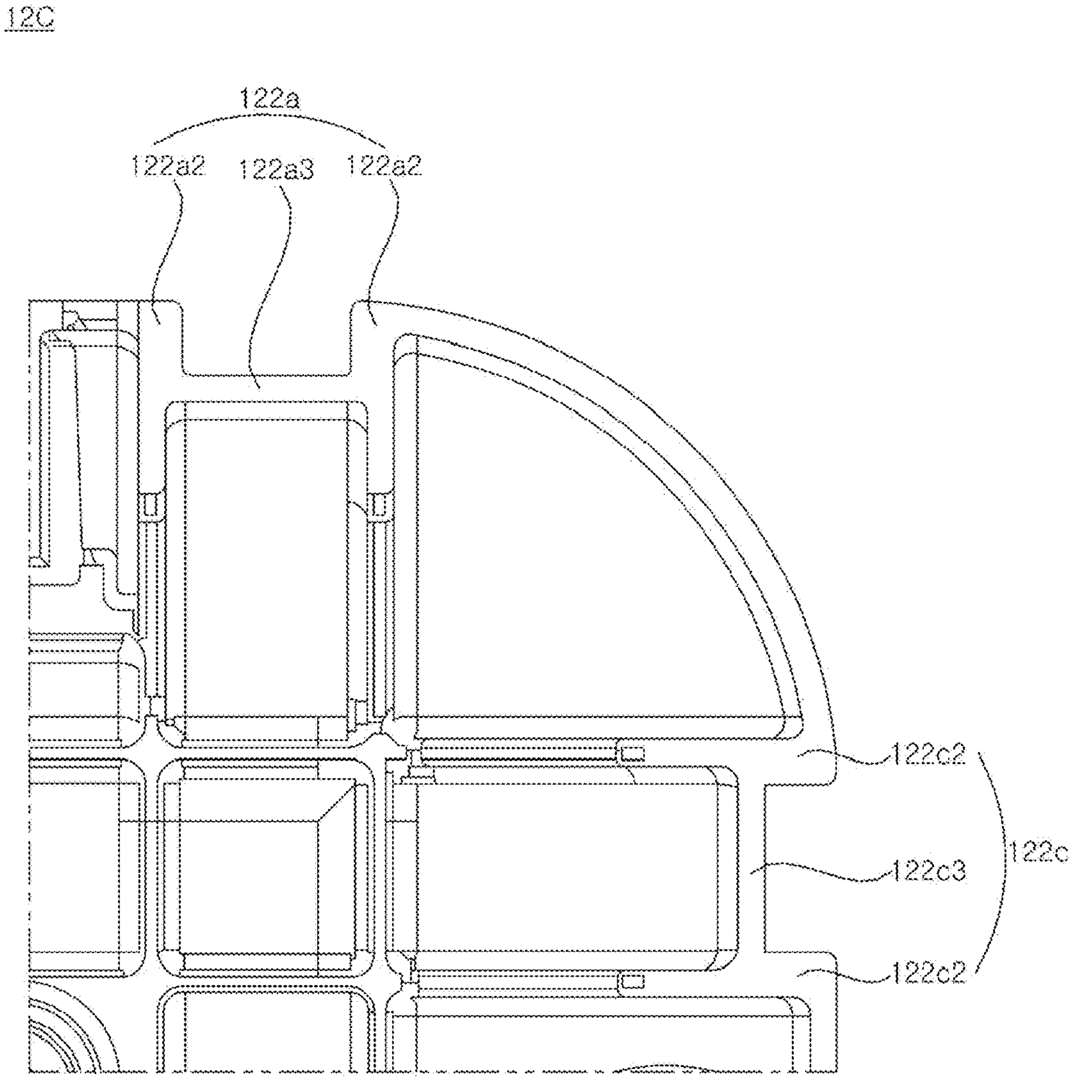

Referring to FIGS. 10 and 11 jointly with FIGS. 7 and 8, the first part 121*a* of the inner beam 1 may include a bottom part 121*a*1, a side part 121*a*2, and a top part 121*a*3. The bottom part 121*al* may form a bottom surface of the first part 121*a* of the inner beam 121.

The side part 121*a*2 may be curved and extended from the bottom part 121*a*1. The top part 121*a*3 may be curved and extended from the side part 121*a*2. For example, the top part 121*a*3, the side part 121*a*2 may have a generally H shape.

The first part 122*a* of the outer beams 122*a*, 122*b*, 122*c*, and 122*d* may include a bottom part 122*a*1, a side part 122*a*2, and a top part 122*a*3. The bottom part 122*al* may form a bottom surface of the first part 122*a* of the outer beams 122*a*, 122*b*, 122*c*, and 122*d*.

The side part 122*a*2 may be curved and extended from the bottom part 122*a*1. The top part 122*a*3 may be curved and extended from the side part 122*a*2. For example, the bottom part 122*a*1, the top part 122*a*3, and the side part 122*a*2 may have the generally U shape. As a result, the rigidity of the frame 12 may be enhanced.

Referring to FIGS. 11 and 7, the first part 122*a* of the outer beams 122*a*, 122*b*, 122*c*, and 122*d* may cross the third part 122*c* of the outer beams 122*a*, 122*b*, 122*c*, and 122*d*. For example, a cross section of the first part 122*a* of the outer beams 122*a*, 122*b*, 122*c*, and 122*d* may have a generally H shape, and a cross section of the third part 122*c* may have a generally H shape. As a result, a corner rigidity of the frame 12 may be enhanced.

The first part 122*a* of the outer beams 122*a*, 122*b*, 122*c*, and 122*d* may cross the second part 122*b* of the outer beams 122*a*, 122*b*, 122*c*, and 122*d*. For example, the cross section of the first part 122*a* of the outer beams 122*a*, 122*b*, 122*c*, and 122*d* may have the generally H shape, and a cross section of the second part 122*b* may have the generally H shape. As a result, the corner rigidity of the frame 12 may be enhanced. As a result, the corner rigidity of the frame 12 may be enhanced.

The fourth part 122*d* of the outer beams 122*a*, 122*b*, 122*c*, and 122*d* may cross the third part 122*c* of the outer beams 122*a*, 122*b*, 122*c*, and 122*d*. For example, a cross section of the fourth part 122*d* of the outer beams 122*a*, 122*b*, 122*c*, and 122*d* may have the generally H shape, and a cross section of the third part 122*c* may have the generally H shape. As a result, the corner rigidity of the frame 12 may be enhanced.

The fourth part 122*d* of the outer beams 122*a*, 122*b*, 122*c*, and 122*d* may cross the second part 122*b* of the outer beams 122*a*, 122*b*, 122*c*, and 122*d*. For example, a cross section of the fourth part 122*d* of the outer beams 122*a*, 122*b*, 122*c*, and 122*d* may have the generally H shape, and a cross section of the second part 122*b* may have the generally H shape. As a result, the corner rigidity of the frame 12 may be enhanced.

Figure 12:
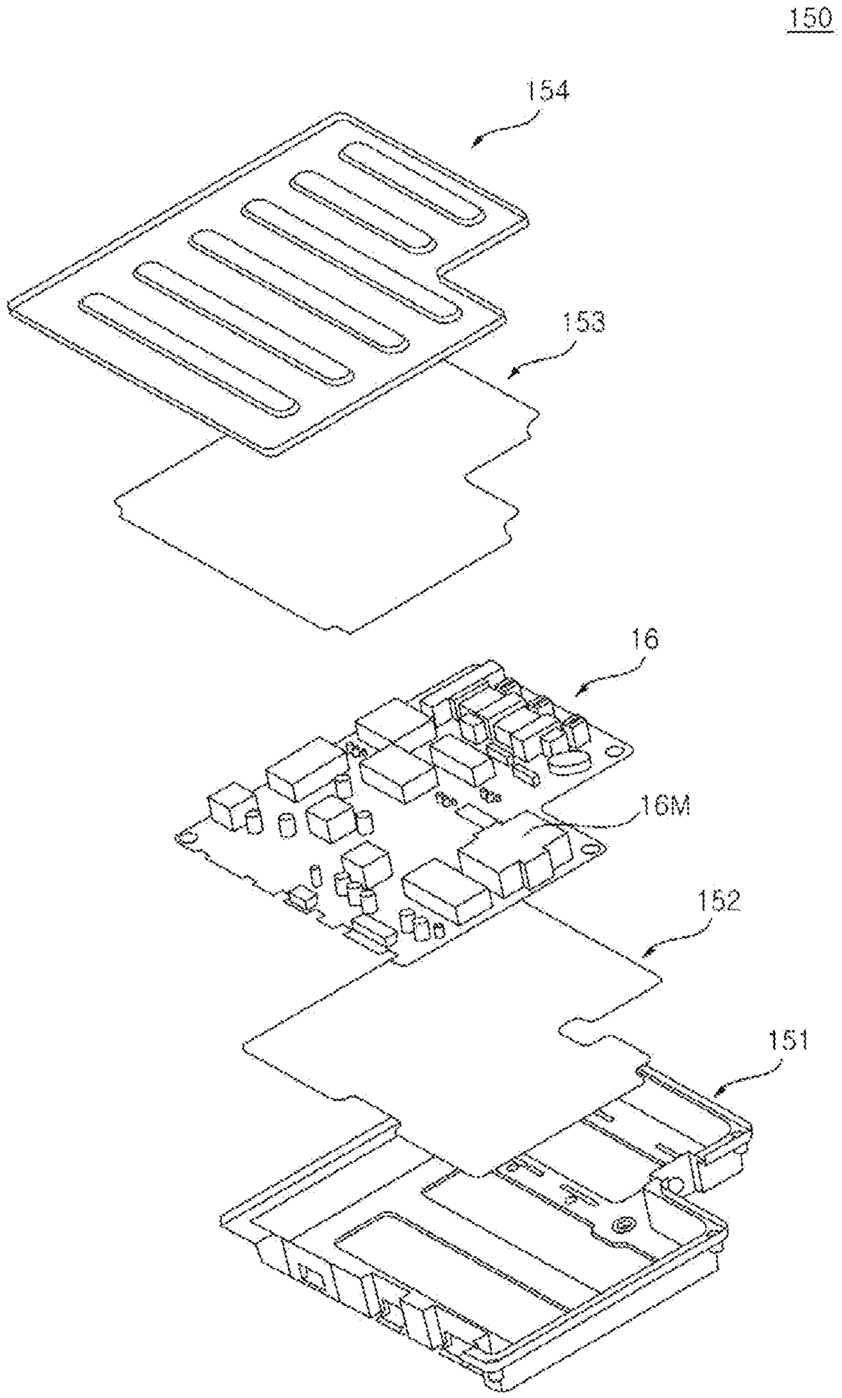

Referring to FIG. 12, the housing 150 may include a lower case 151 and an upper case 154. The lower case 151 may be a tub shape providing an accommodation space therein. For example, the lower case 151 may be an injection made of a flame retardant material. The lower case 151 may be a material in which chemical resistance characteristics are enhanced. The lower case 151 may have an opening for weight lightening. The lower plate 152 may be positioned on a bottom of the lower case 151. The lower plate 152 may include metal. The lower plate 152 may cover the opening of the lower case 151.

At least one electric element 16M may be mounted on the substrate 16. For example, the substrate 16 may be a power supply unit (PSU) or a main board. The substrate 16 may be positioned on the lower plate 152.

The upper plate 153 may be positioned on the substrate 16. The upper plate 153 may include the metal. The upper plate 153 may face the lower plate 152.

The upper cover 154 may cover the upper plate 153, and close the lower case 151. The upper cover 154 may include the metal. For example, the upper cover 154 may be aluminum. The upper cover 154 may be coupled to the lower case 151.

As a result, chemical resistance of the substrate 16 on which the electric elements 16M are mounted may be enhanced.

Figure 13:
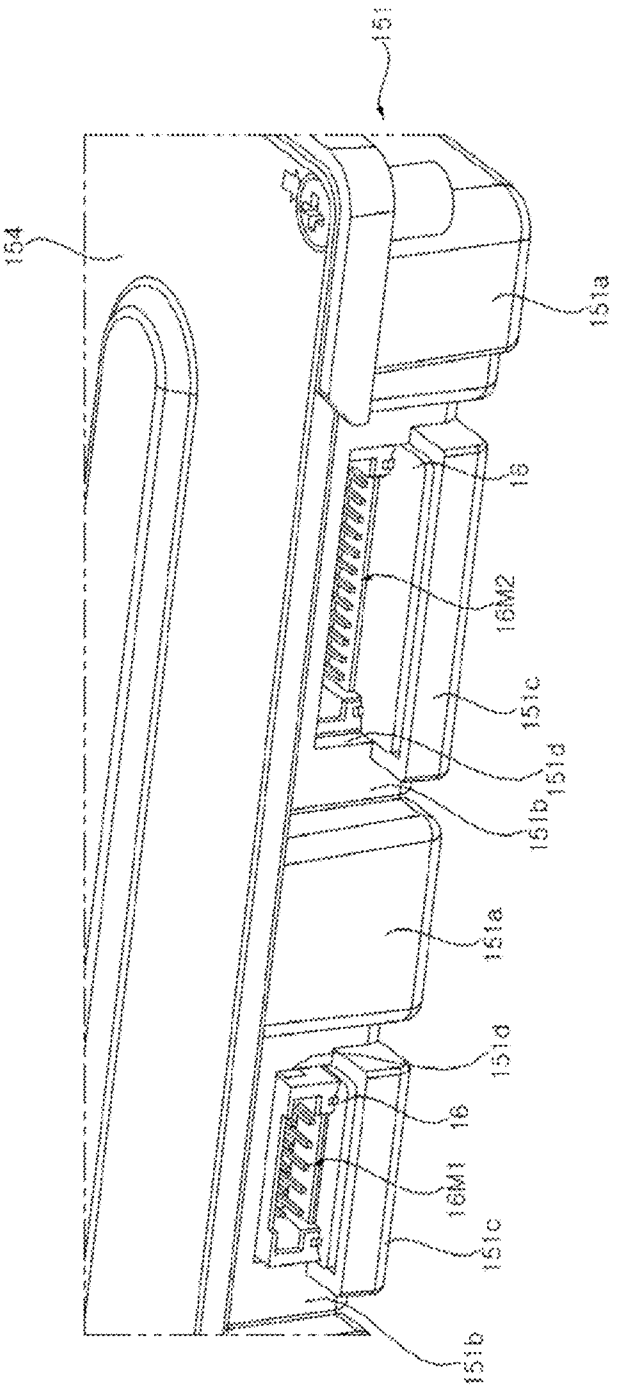
Figure 14:
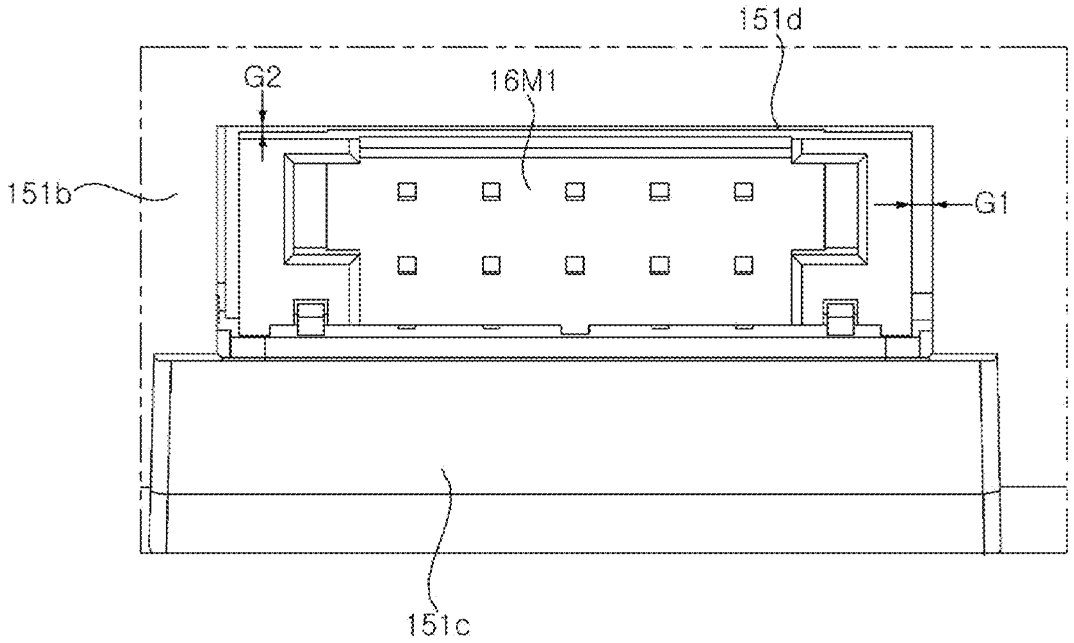

Referring to FIGS. 13 and 14, the housing 150 may include a docking opening 151*d*. The docking opening 151*d* may be formed on a side surface of the housing 150. A recess side wall 151*b* may be formed around the docking opening 151*d*. The recess side wall 151*b* may be recessed while forming a step inward from an outer side wall 151*a* of the housing 150.

Connectors 16M1 and 16M2 mounted on the substrate 16 may be exposed to the outside through the docking opening 151*d*. The under cover 151*c* may be formed below the docking opening 151*d*. The under cover 151*c* may support the connectors 16M1 and 16M2 exposed through the docking opening 151*d* and/or the substrate 16 below the connectors 16M1 and 161M2. The under cover 151*c* may be protruded from the recess side wall 151*b*. An outer surface of the under cover 151*c* may correspond to an outer surface of the outer side wall 151*a*.

Gaps G1 and G2 may be formed between the connectors 16M1 and 16M2, and the docking opening 151*d*. The gaps G1 and G2 may include a first gap G1 and a second gap G2. The first gap G1 may be formed between the connectors 16M1 and 16M2, and a left inner surface or a right inner surface of the docking opening 151*d*. The second gap G2 may be formed between the connectors 16M1 and 16M2, and an upper inner surface of the docking opening 151*d*.

As a result, the chemical resistance characteristics may be enhanced, and external shock may be prevented from being applied to main components.

Figure 15:
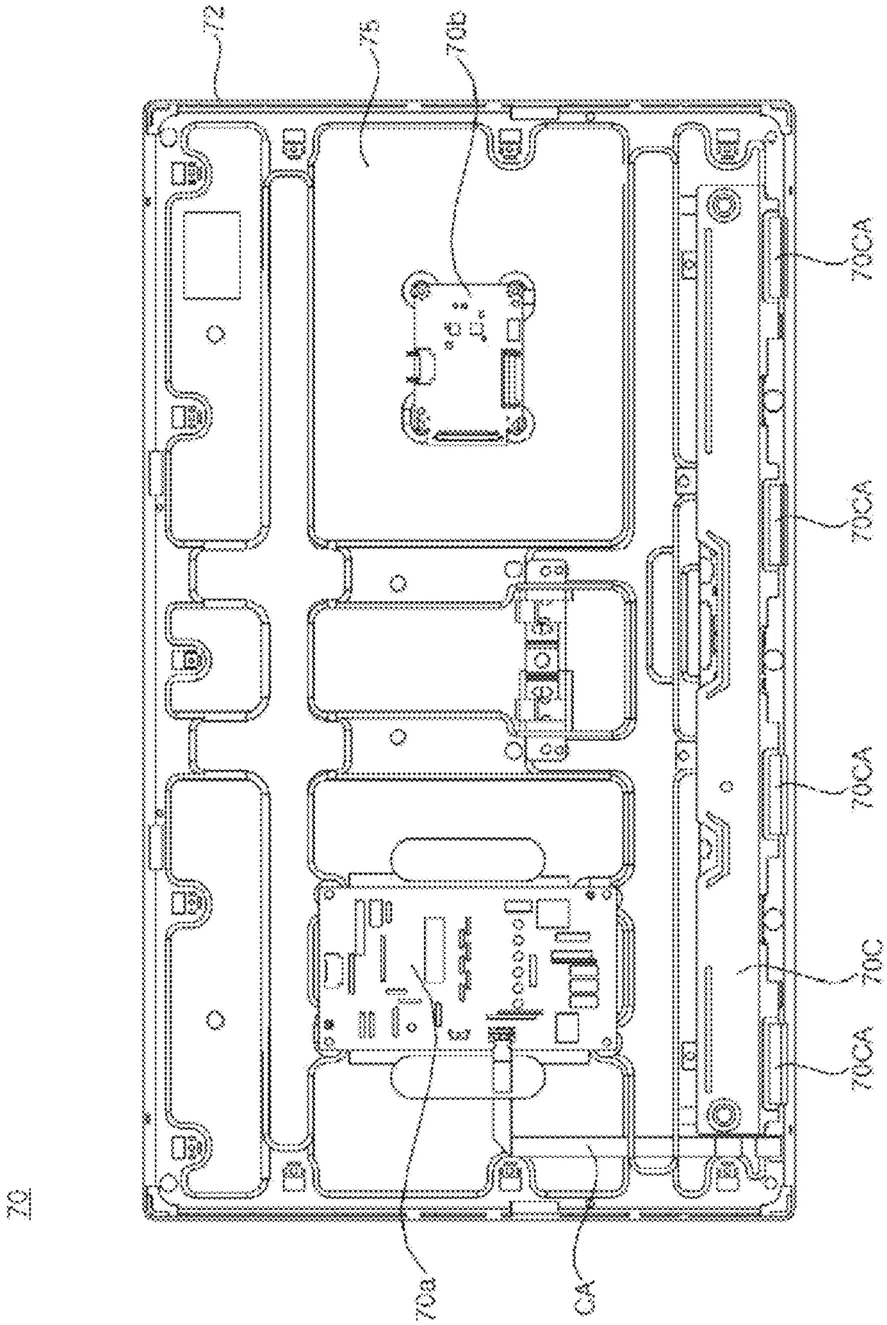
Figure 16:
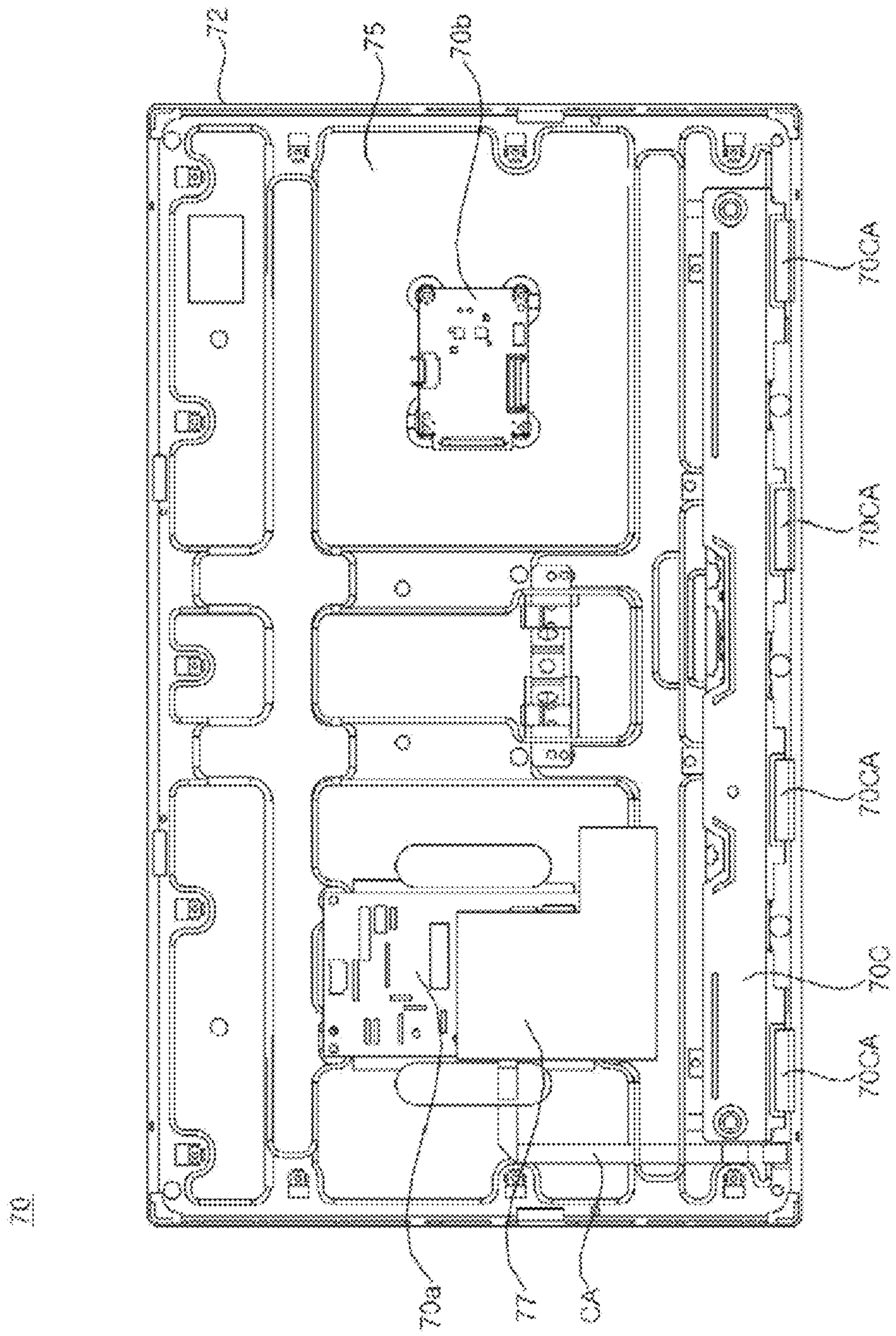

Referring to FIGS. 15 and 16, control boards 70*a*, 70*b*, and 70*c* may be mounted or fixed onto a rear surface of the frame 75 of the display 70. For example, the control boards 70*a*, 70*b*, and 70*c* may be a power board 70*a*, a sub board 70*b*, or a source PCB 70*c*. Electronic elements may be mounted on the control boards 70*a*, 70*b*, and 70*c*, and heat may be generated while the electronic elements are driven.

A flexible cable CA may electrically connect the power board 70*a* and the display panel 71, The power board 70*a* may adjust electric power and/or a signal provided to a light source of the display 70. The power board 70*a* may be called a light source drive board 70*a*. The sub board 70*a* may process image information provided to the display panel 71 (see FIG. 1). The source PCB 70*c* may be adjusted to the lower side of the frame 75, and mounted or fixed onto the rear surface of the frame 75. A COF 70CA may electrically connect the source PCB 70*c* and the display panel 71, A shielding member 77 may cover the control boards 70*a*, 70*b*, and 70*c*. The shielding member 77 may be called a first shielding member 77, a display shielding member 77, a heat dissipation sheet 77, or a heat diffusion sheet 77. For example, the shielding member 77 may be a graphite sheet. The shielding member 77 may cover the power board 70*a*. The shielding member 77 may overlap with at least a part of the power board 70*a*.

Figure 17:
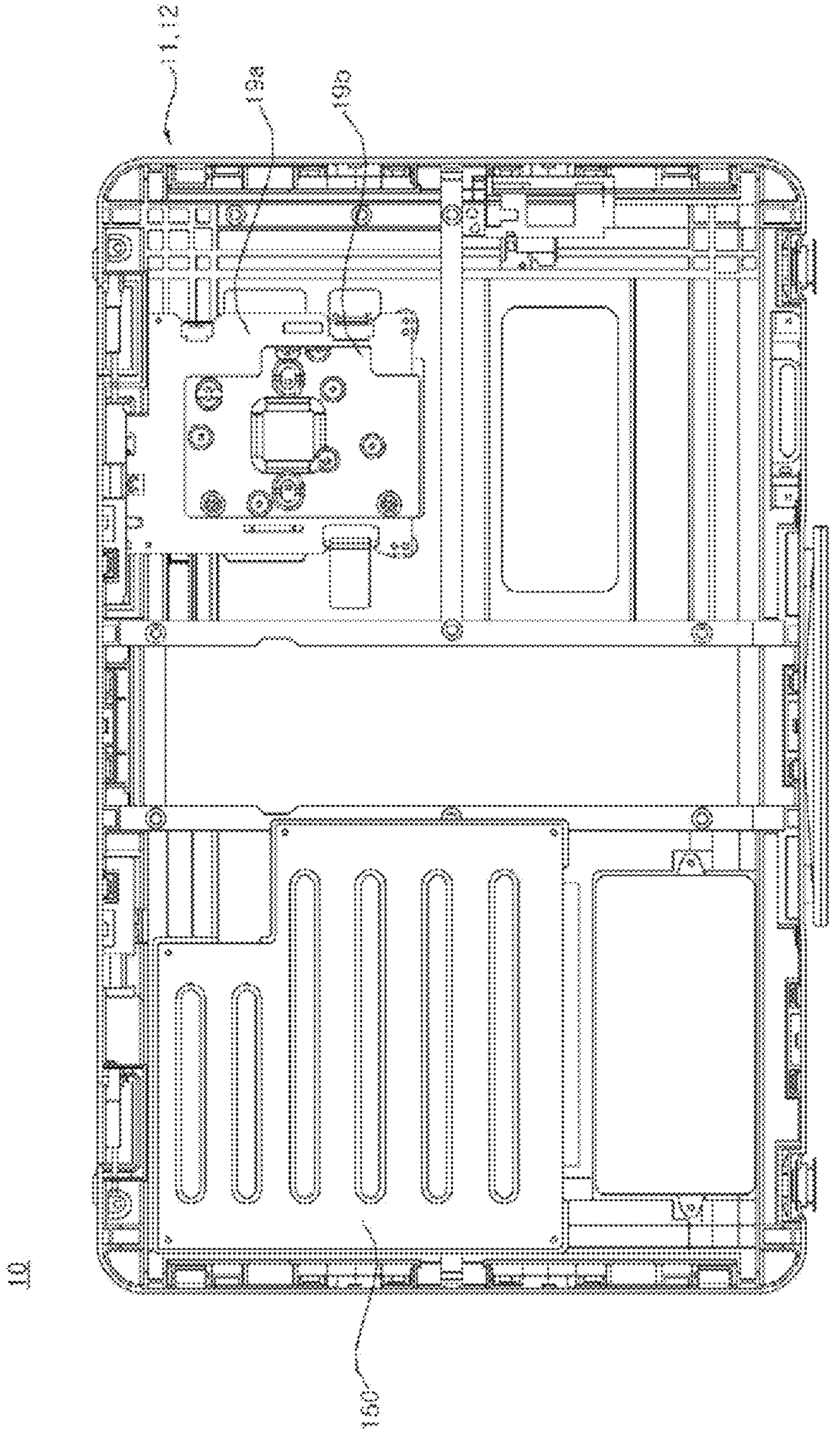
Figure 18:
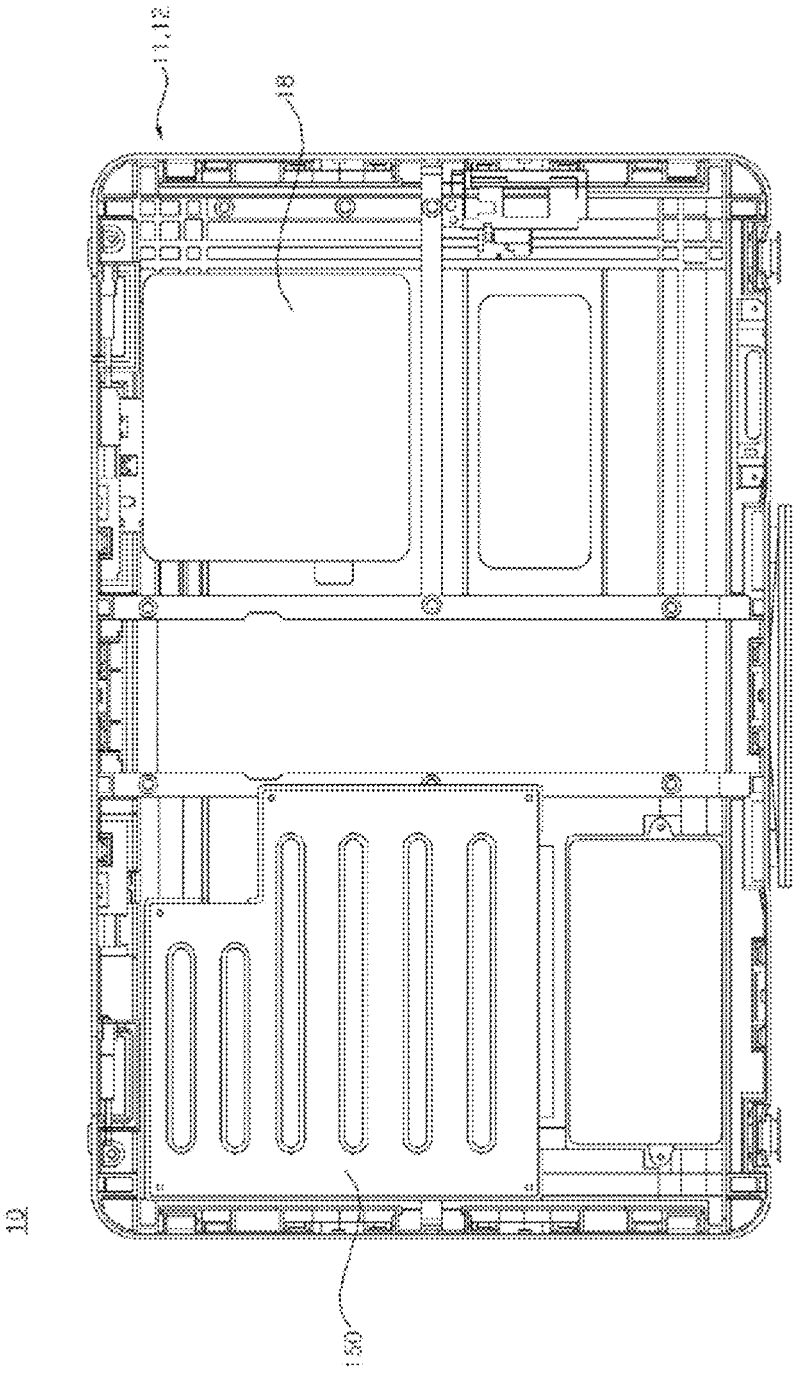

Referring to FIGS. 17 and 18, the housing 150 having the power supply unit 16 (see FIG. 6) embedded therein may be mounted or coupled onto the framed 12 of the base 10. A main board 19*a* may be adjacent to the housing 150 of the power supply unit 16, and mounted or coupled onto the frame 12 of the base 10. The power supply unit 16 may supply electric power required for the display device 1 (see FIG. 1). The main board 19*a* may provide the image information displayed through the display panel 71 and/or voice information provided through a speaker assembly. The power supply unit 16 and/or the main board 19*a* may generate heat upon driving.

A shield plate 19*b* may cover a part of the main board 19*a* and may be mounted or fixed onto the frame 12. The shield plate 19*b* may prevent physical and electrical damages of the main board 19*a*.

The shielding member 18 may cover the main board 19*a*. The shielding member 18 may be called a second shielding member 18, a base shielding member 18, a heat dissipation sheet 18, or a heat diffusion sheet 18. The shielding member 18 may overlap with the entirety or at least a part of the power board 19*a*. For example, the shielding member 18 may be the graphite sheet.

Figure 19:
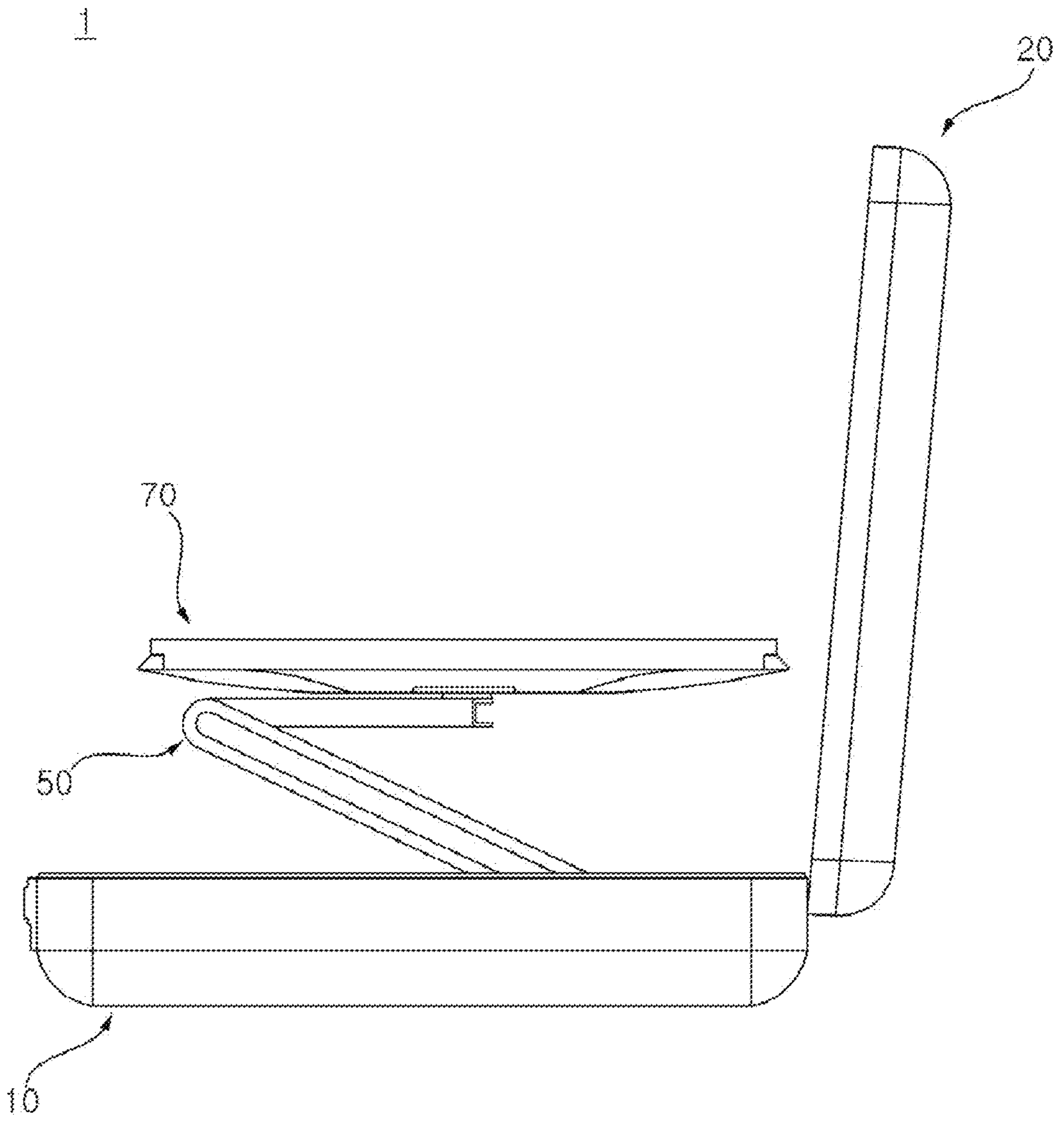
Figure 20:
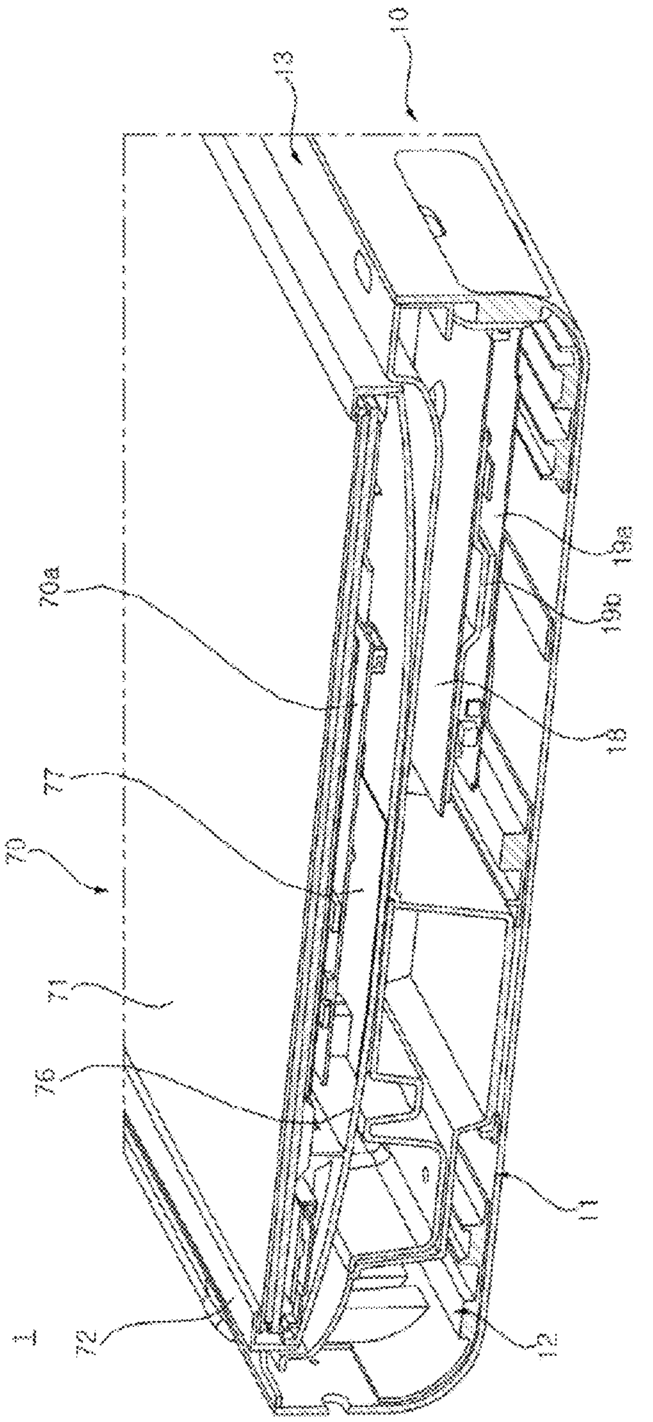

Referring to FIGS. 19 and 20, while the cover 20 is opened and closed around the hinge 30 (see FIG. 1) from the base 10, the display 70 may be stored inside the base 10. The display 70 may move to the outside of the base 10 or may be stored in the base 10 by the arm 50. When the display 70 is stored in the base 10, the display 70 and the base 10 may be placed in line, and may face each other.

The side cover 72 may cover the side surface of the display panel 71, and the back cover 76 may be positioned in the rear of the display panel 71 and coupled to the side cover 72. The control board 70*a* may be positioned between the display panel 71 and the back cover 76. For example, the control board 70*a* may be the light source drive board 70*a*, and when the control board 70*a* is driven, high-temperature heat may be generated. The heat generated from the control board 70*a* may be released to the outside through the back cover 76.

The main board 19*a* mounted on the frame 12 of the base 10 may be positioned between the frame 12 and the top 13. When the main board 19*a* is driven, a lot of heat may be generated, and the heat may be released to the outside through the top 13.

A first shielding member 77 may be positioned between the control board 90*a* and the back cover 76. The first shielding member 77 may be fixed or bonded onto the back cover 76. For example, the first shielding member 77 may be the graphite sheet. A second shielding member 18 may be positioned between the main board 19*a* and the top 13.

Jointly referring to FIGS. 15 and 17, FIG. 15 may illustrate the rear surface of the display 70 facing the base 10, and FIG. 17 may illustrate the front surface of the base 10 facing the display 70.

The housing 150 having the power supply unit 16 (see FIG. 6) embedded therein may generate high-temperature heat. The light source drive board 70*a* may generate high-temperature heat. When the display 70 is stored in the base 10, the housing 150 having the power supply unit 16 embedded therein may not overlap with the light source drive board 70*a*. As a result, the heat generated from the housing 150 and the heat generated from the light source drive board 70*a* may be evenly diffused in the display device 1.

When the display 70 is stored in the base 10, the light source drive board 70*a* may overlap with at least a part of the main board 19*a*. The heat generated from the light source drive board 70*a* and the heat generated from the main board 19*a* may be accumulated while being released to each other.

The heat generated from the light source drive board 70*a* may be diffused and dissipated in a horizontal direction by the first shielding member 77. The heat generated from the main board 19*a* may be diffused and dissipated in the horizontal direction by the second shielding member 18. For example, a part or at least a part of the first shielding member 77 may overlap with the second shielding member 18. As another example, the first shielding member 77 may also be aligned not to overlap with the second shielding member 18. As another example, the first shielding member 77 may be adjacent to the second shielding member 18 while forming a boundary with the second shielding member 18. As a result, the heat generated from the main board 19*a* and the heat generated from the light source drive board 70*a* may be not accumulated, but diffused.

As a result, even though the display 70 is stored in the base 10, heat generated by driving of the display 70 may be evenly diffused and dissipated.

Figure 21:
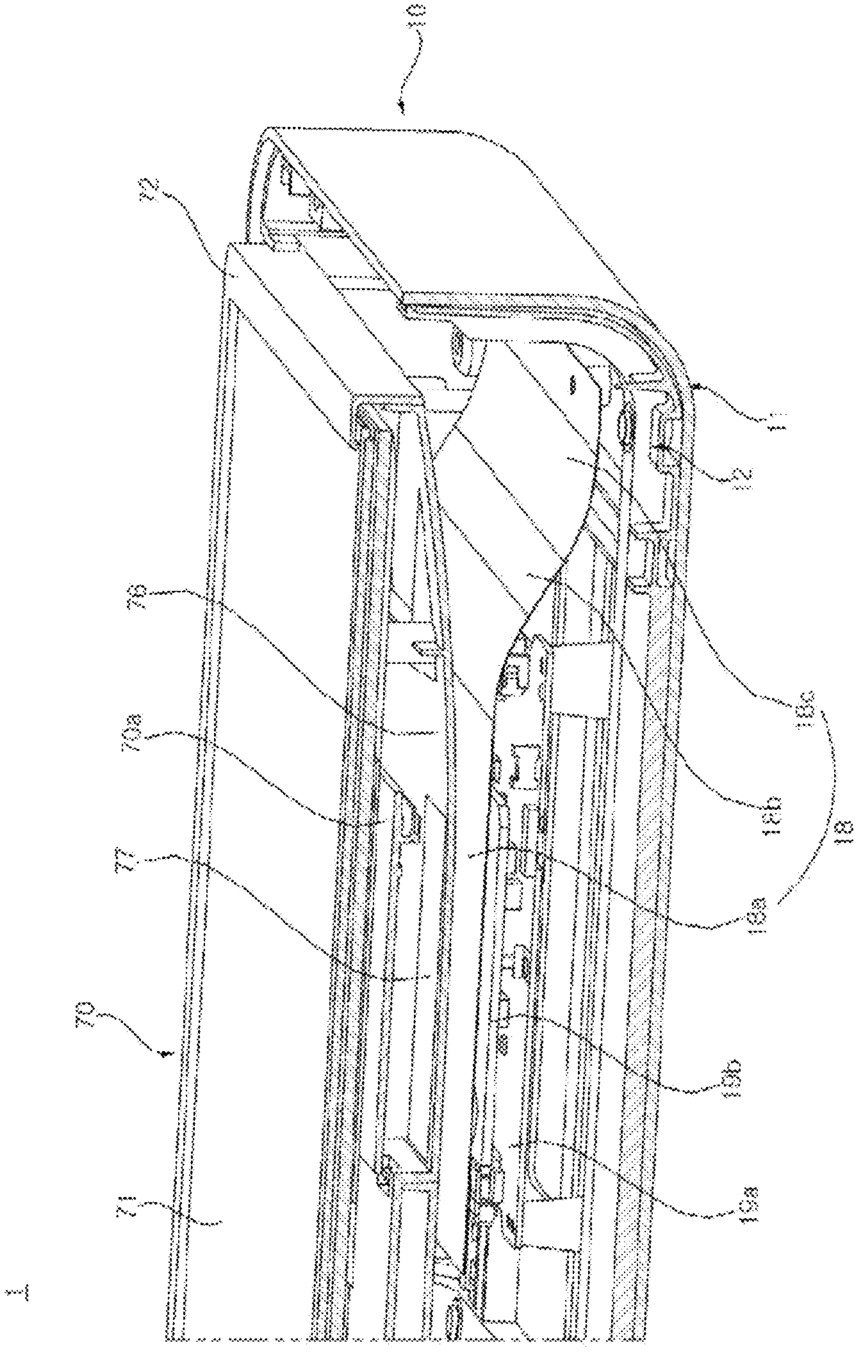

Referring to FIG. 21, the second shielding member 18 may include a first sheet part 18*a*, a second sheet part 18*b*, and a third sheet part 18*c*.

The first sheet part 18*a* may be positioned between the main board 19*a* and the light source drive board 70*a*, and may cover the main board 19*a*. The second sheet part 18*b* may be extended from the first sheet part 18*a*. The second sheet part 18*b* may form a slope which is lowered from the first sheet part 18*a*.

The second sheet part 18*b* may be curved and extended toward the bottom of the frame 12 of the base 10 from the first sheet part 18*a*. The third sheet part 18*c* may be positioned above the bottom of the frame 12 of the base 10, and may cover the bottom of the frame 12.

The first sheet part 18*a* may have a negative slope toward the second sheet part 18*b*. The slope of the first sheet part 18*a* may be smaller than the slope of the second sheet part 18*b*.

As a result, moisture which may be formed on the second shielding member 18 covering the main board 19*a* may be discharged while passing through the first sheet part 18*a*, the second sheet part 18*b*, and the third sheet part 18*c* according to on/off of the main board 19*a*.

Figure 22:
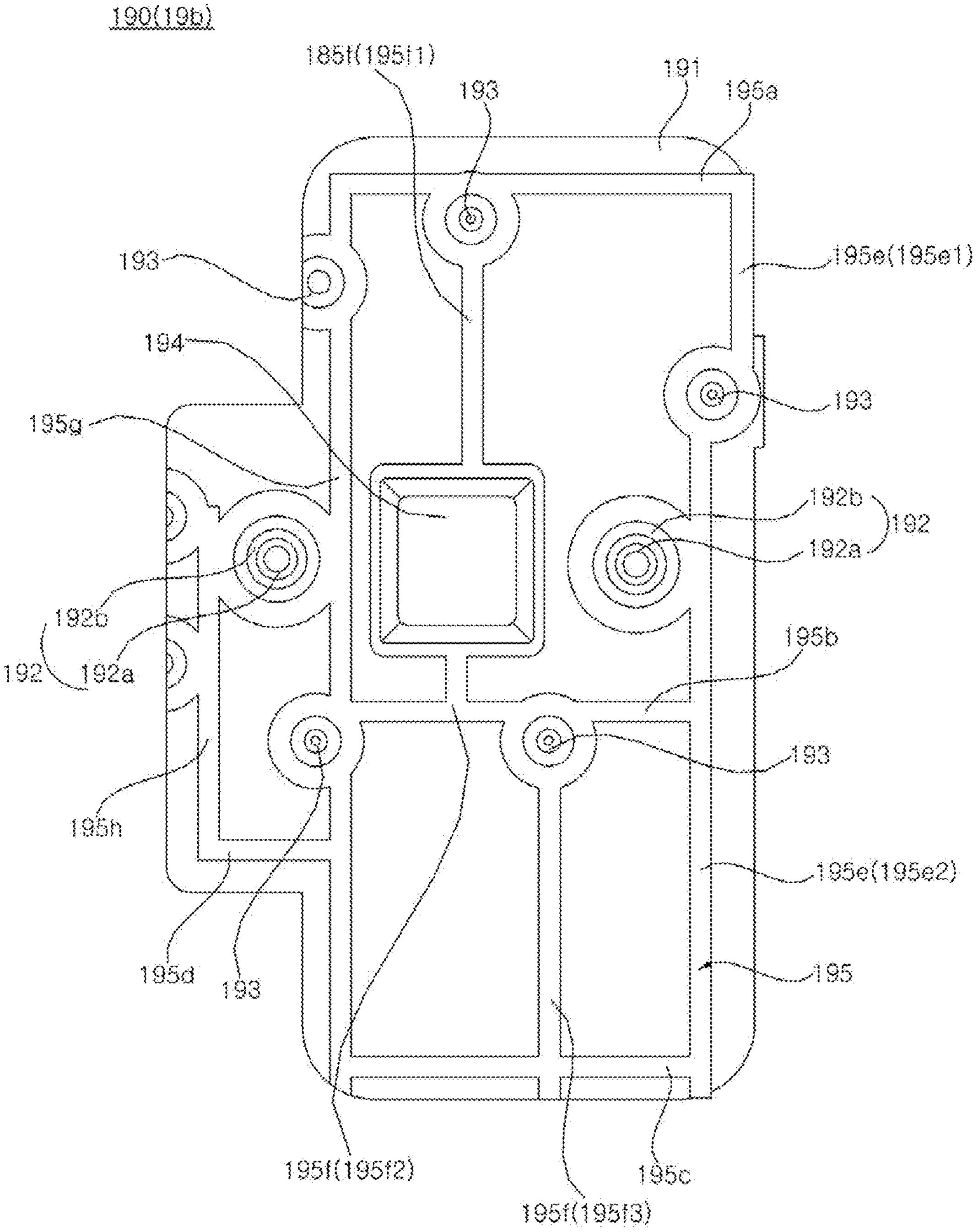
Figure 23:
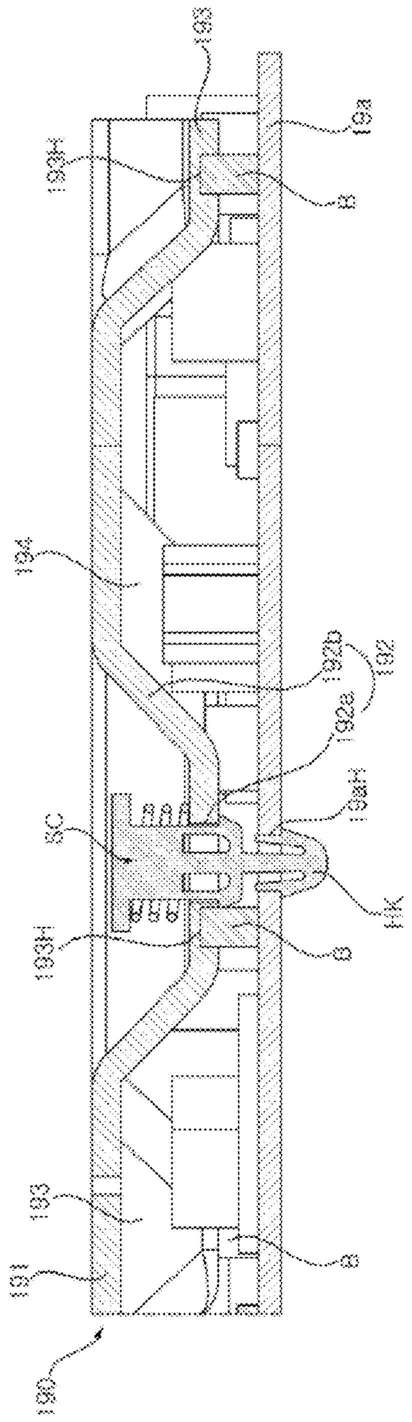

Referring to FIGS. 22 and 23, shield plates 19*b* and 190 may include a flat part 191, a support groove 193, a coupling groove 192, a contact part 194, and a drain path 195 . . . . For example, the shield plate 190 may include the metal, and may be pressed and formed. One surface of the plat part 191 may be coated with an insulating material. The surface of the flat part 191 coated with the insulating material may face the main board 19*a*.

The flat part 191 may be a flat plate 191. The flat part 191 may correspond to a shape and/or a size of the main board 19*a*. The support groove 193 and/or the coupling groove 192 may be formed as the flat part 191 is recessed. The support groove 193 and/or the coupling groove 192 may have a generally cone shape. For example, a diameter of the coupling groove 192 may be larger than a diameter of the support groove 193. There may be a plurality of support grooves 193.

The coupling groove 192 may include a slope portion 192*b* and a hole 192*a*. The slope portion 192*b* may be formed as the flat part 191 is recessed. The hole 192*a* may be formed on a bottom of the slope portion 192*b*. A diameter of the hole 192*a* may be smaller than a diameter of an upper end of the coupling groove 192. There may be a plurality of coupling grooves 192.

The contact part 194 may be recessed from the flat part 194. A recess direction of the contact part 194 may be the same as a recess direction of the support groove 193 and/or the coupling groove 192. The contact part 194 may have a generally square dome shape. A rear surface of a bottom of the contact part 194 may be in contact with an electronic element of the main board 19*a*. For example, the electronic element may be an integrated circuit semiconductor chip. The contact part 194 may receive heat of the electronic element.

The drain path 195 may include horizontal lines 195*a*, 195*b*, 195*c*, and 195*d* and vertical lines 195*e*, 195*f*, 195*g*, and 195*h*. The drain path 195 may be recessed inside the flat part 191 or formed by cutting the flat part 191. The horizontal lines 195*a*, 195*b*, 195*c*, and 195*d* may include a first horizontal line 195*a*, a second horizontal line 195*b*, a third horizontal line 195*c*, and a fourth horizontal line 195*d*. The vertical lines 195*e*, 195*f*, 195*g*, and 195*h* may include a first vertical line 195*e*, a second vertical line 195*f*, a third vertical line 195*g*, and a fourth vertical line 195*h*. The vertical lines 195*e*, 195*f*, 195*g*, and 195*h* may cross or may be orthogonal to the horizontal lines 195*a*, 195*b*, 195*c*, and 195*d*.

The first horizontal line 195*a* may be positioned to be adjacent to an upper end of the flat part 191. The third horizontal line 195*c* may be positioned to be adjacent to a lower end of the flat part 191. The second horizontal line 195*b* may be positioned between the first horizontal line 195*a* and the third horizontal line 195*c*. The fourth horizontal line 195*d* may be positioned between the second horizontal line 195*b* and the third horizontal line 195*c*.

The first vertical line 195*e* may be positioned to be adjacent to a right end of the flat part 191. The third vertical line 195*g* may be positioned to be adjacent to a left end of the flat part 191. The second vertical line 195*f* may be positioned between the first vertical line 195*e* and the third vertical line 195*g*. The fourth vertical line 195*h* may be opposite to the second vertical line 195*f* with respect to the third vertical line 195*g*.

The first vertical line 195*e* may include a first line 195*e*1 and a second line 195*e*2. A length of the second line 195*e*2 may be larger than a length of the first line 195*e*1. The first line 195*e*1 may be positioned to be adjacent to a right edge of the flat part 191, and the second line 195*e*2 may be positioned further from the right edge of the flat part 191 than the first line 195*e*1. The support groove 193 may connect the first line 195*e*1 and the second line 195*e*2.

The second vertical line 195*f* may include a first part 195*f*1, a second part 195*f*2, and a third part 195*f*3. The first part 195*f*1 may connect the support groove 193 and the contact part 194. The second part 195*f*2 may connect the contact part 194 and the second horizontal line 195*b*. The third part vertical line 195*f*3 may be positioned to be adjacent to a lower edge of the flat part 191. The third part 195*f*3 may connect the support groove 193 and the third horizontal line 195*c*.

The third vertical line 195*g* may be positioned to be adjacent to a left edge of the flat part 191 while passing through at least one support groove 193. The third vertical line 195*g* may be opposite to the first vertical line 195*e* with respect to the second vertical line 195*f*.

The fourth vertical line 195*h* may be connected to the fourth horizontal line 195*d*, and may be opposite to the third vertical line 195*g* and the coupling groove 192. The first vertical line 195*e*, the second vertical line 195*f*, and/or the third vertical line 195*g* may be connected to the lower edge of the flat part 191. As a result, water vapor and/or water condensed or collected on the shield plates 91*b* and 190 may be discharged to the outside through the drain path 195.

The shield plate 190 may be positioned on the main board 19*a*, and may cover the main board 19*a*. The shield plate 190 may be supported by bosses B or coupled to the main board 19*a* by a support clip SC. The boss B may support an outer surface of the support groove 193 or may be inserted into the outer surface of the support groove 193. A boss insertion groove 193H may be formed on the outer surface of the support groove 193. The boss may be press-fitted into the boss insertion groove 193H.

The support clip SC may penetrate a hole 192*a* of the coupling groove 192. The support clip SC may be inserted into the coupling groove 192 and coupled to the main board 19*a*. A clip hole 19*a*H may be formed to penetrate the main board 19*a*. The support clip SC may be fitted into the clip hole 19*a*H. A hook HK of the support clip SC may prevent separation of the support clip SC coupled to the clip hole 19*a*H.

Figure 24:
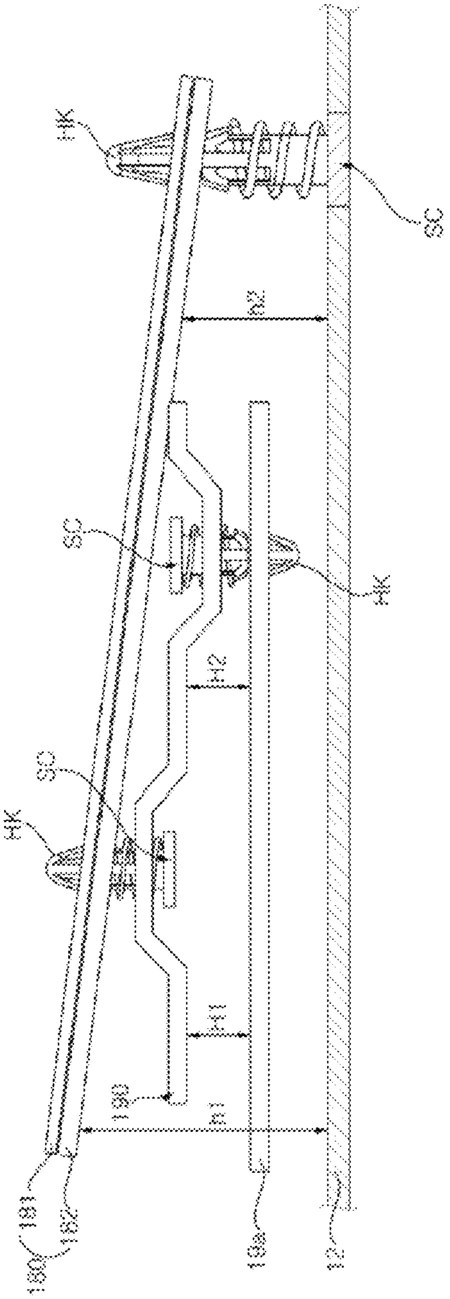

Referring to FIG. 24, the shield plate 190 may form a slope with respect to the main board 19*a*. The shield plate 190 and the main board 19*a* may form a first distance H1 and a second distance H2. The first distance H1 may be a location close to the first horizontal line 195*a*, and the second distance H2 may be a location close to the third horizontal line 195*c*. The first distance H1 may be larger than the second distance H2.

The shielding member 180 may include a plurality of sheets 181 and 182. The shielding member 180 may include a first sheet 181 and a second sheet 182. The shielding member 180 may be coupled or fixed to the shield plate 190 and/or the base frame 12 by the support clip SC. The support clip SC may penetrate the shielding member 180, and the separation of the shielding member 180 may be prevented by the hook HK. The second sheet 182 may be bonded to the first sheet 181. For example, the first sheet 181 may be an insulating sheet, and the second sheet 182 may be the graphite sheet. As another example, the first sheet 181 may be the graphite sheet, and the second sheet 182 may be the insulating sheet.

The shielding member 180 may be positioned on the shield plate 190, and may cover the shield plate 190 and/or the main board 19*a*. The shielding member 180 may form the slope with respect to the base frame 12. The base frame 12 may be parallel to the main board 19*a*. The shielding member 180 may form a first distance h1 and a second distance h2 from the base frame 12. The first distance h1 may be a location close to the first horizontal line 195*a*, and the second distance h2 may be a location close to the third horizontal line 195*c*. The first distance h1 may be larger than the second distance h2.

An angle which the shielding member 180 forms with respect to the base frame 12 may be larger than an angle which the shield plate 190 forms with respect to the base frame 12. As a result, water vapor or water droplets condensed and/or collected in the shielding member 180 may be drained. Water vapor or water droplets condensed and/or collected in the shield plate 190, which remains after primary drainage may be made by the shielding member 180 may be drained.

Referring to FIGS. 1 to 24, the display device of the present disclosure may include: a display module including a display panel; a bottom case on which the display module is movably mounted; and a top case hinge-connected to the bottom case, and the bottom case may include an outer shell providing an accommodation space, a bottom frame positioned in the accommodation space of the outer shell, and coupled to the outer shell, a top plate covering the accommodation space, and opposite to the outer shell with respect to the bottom frame, a main board positioned between the bottom frame and the top plate, and coupled to the bottom frame, and a shielding member positioned between the top plate and the main board, and overlapping with at least a part of the main board, and the shielding member may form a first slope with respect to the bottom frame.

The bottom case may include a shield plate positioned between the shielding member and the main board, and covering at least a part of the main board, and the shield plate may form a second slope with respect to the bottom frame.

The first slope may be larger than the second slope.

The shield plate may include a first surface facing the main board, a second surface facing the first surface, and a drain path formed by recessing or deleting the second surface, and elongated on the second surface.

The drain path may include a vertical line elongated in a direction in which the slope of the shield plate is lowered, and a horizontal line crossing the vertical line.

The vertical line may be connected to an edge of the shield plate.

The shielding member may include a first sheet forming an upper layer, and a second sheet forming a lower layer and coupled to the first sheet.

The first sheet may include an insulating material, and the second sheet may include graphite.

The display device may further include an arm of which one side is pivotably connected to the bottom case, and the other side is pivotably connected to the display module, and the display module may be stored in the bottom case or erected from the bottom case by pivot movement of the arm.

The display module may be stored while facing the top plate between the top plate and the top case when the top case covers the bottom case, or erected from the top plate while facing the top case when the top case opens the bottom case.

Certain embodiments or other embodiments of the present disclosure described above are not mutually exclusive or distinct from each other. Any or all elements of the embodiments of the invention described above may be combined or combined with each other in configuration or function.

For example, it is meant that a configuration "A" described in a specific embodiment and/or the drawings and a configuration "B" described in another embodiment and the drawings may be combined with each other. Namely, although the combination between the configurations is not directly described, the combination is possible except in the case where it is described that the combination is impossible.

The aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

What is claimed is:

1. A display device comprising:
- a display including a display panel;
- a bottom case on which the display is movably mounted; and
- a top case hinge-connected to the bottom case,
- wherein the bottom case includes:
  - an outer shell providing an accommodation space;
  - a bottom frame positioned in the accommodation space of the outer shell, and coupled to the outer shell;
  - a top plate covering the accommodation space, and opposite to the outer shell with respect to the bottom frame;
  - a main board positioned between the bottom frame and the top plate, and coupled to the bottom frame;
  - a shielding member positioned between the top plate and the main board, and overlapping with at least a portion of the main board; and
  - a shield plate positioned between the shielding member and the main board, and covering at least a second portion of the main board,
- wherein the shielding member forms a first slope with respect to the bottom frame, and
- wherein the shield plate forms a second slope with respect to the bottom frame.

2. The display device of claim 1, wherein the first slope is larger than the second slope.

3. The display device of claim 1, wherein the shield plate has:
- a first surface facing the main board,
- a second surface facing the first surface; and
- a drain path corresponding to a recess or a cutting of the second surface, and extending along the second surface.

4. The display device of claim 3, wherein the drain path includes
- a vertical path extending along a direction in which the second slope of the shield plate is lowered, and
- a horizontal path crossing the vertical path.

5. The display device of claim 4, wherein the vertical path is connected to an edge of the shield plate.

6. The display device of claim 1, wherein the shielding member includes:
- a first sheet forming an upper layer; and a second sheet forming a lower layer and coupled to the first sheet.

7. The display device of claim 6, wherein the first sheet includes an insulating material, and wherein the second sheet includes graphite.

8. The display device of claim 1, further comprising:

an arm having a first end pivotably connected to the bottom case and a second end pivotably connected to the display, wherein the display is caused to be stored in the bottom case or erected from the bottom case by a pivot movement of the arm.

9. The display device of claim 1, wherein the display is caused to be stored between the top plate and the top case while facing the top plate when the top case covers the bottom case, or erected from the top plate while facing the top case when the top case is opened from the bottom case.

* * * * *